(12) United States Patent
Hendren et al.

(10) Patent No.: US 11,775,031 B2
(45) Date of Patent: Oct. 3, 2023

(54) ELECTRONIC DEVICE DISPLAY

(71) Applicant: Apple Inc., Cupertino, CA (US)

(72) Inventors: Keith J. Hendren, San Francisco, CA (US); Dinesh C. Mathew, San Francisco, CA (US); Bryan W. Posner, San Francisco, CA (US); Adam T. Garelli, Morgan Hill, CA (US)

(73) Assignee: APPLE INC., Cupertino, CA (US)

( * ) Notice: Subject to any disclaimer, the term of this patent is extended or adjusted under 35 U.S.C. 154(b) by 7 days.

(21) Appl. No.: 17/383,251

(22) Filed: Jul. 22, 2021

(65) Prior Publication Data

US 2022/0214724 A1 Jul. 7, 2022

Related U.S. Application Data

(60) Provisional application No. 63/133,519, filed on Jan. 4, 2021.

(51) Int. Cl.
*G06F 1/16* (2006.01)
(52) U.S. Cl.
CPC .......... *G06F 1/1686* (2013.01); *G06F 1/1656* (2013.01); *G06F 1/1683* (2013.01)
(58) Field of Classification Search
CPC ..... G06F 1/1601; G06F 1/1637; G06F 1/1656
See application file for complete search history.

(56) References Cited

U.S. PATENT DOCUMENTS

| 4,898,555 | A | * | 2/1990 | Sampson | G06F 1/1601 |
| | | | | | 348/836 |
| 5,696,529 | A | * | 12/1997 | Evanicky | G03B 21/132 |
| | | | | | 349/5 |
| 5,729,250 | A | * | 3/1998 | Bishop | G06F 3/0421 |
| | | | | | 345/173 |
| 7,443,388 | B1 | * | 10/2008 | Novak | G06F 1/1616 |
| | | | | | 345/82 |
| 9,075,473 | B2 | * | 7/2015 | Moses | G06F 1/1601 |
| 2004/0001022 | A1 | * | 1/2004 | Silzer, Jr. | G06F 1/166 |
| | | | | | 343/702 |
| 2009/0059502 | A1 | * | 3/2009 | Filson | H05K 5/0013 |
| | | | | | 361/679.27 |
| 2011/0103041 | A1 | | 5/2011 | Mathew et al. | |
| 2014/0085796 | A1 | * | 3/2014 | Mathew | G06F 1/1607 |
| | | | | | 361/679.21 |
| 2018/0110143 | A1 | | 4/2018 | Zhao et al. | |
| 2020/0084310 | A1 | | 3/2020 | Keen et al. | |

OTHER PUBLICATIONS

European Search Report for Application No. 21208692.0, dated May 11, 2022 (10 pp.).

* cited by examiner

*Primary Examiner* — Adrian S Wilson
(74) *Attorney, Agent, or Firm* — DORSEY & WHITNEY LLP

(57) ABSTRACT

An electronic device can include a base portion and a display portion rotatably mounted to the base portion. The display portion can have a display housing including a trim that at least partially defines an orifice and a portion of the exterior surface of the electronic device. A display call can be positioned at the orifice in contact with the trim and can be secured to the display housing.

15 Claims, 24 Drawing Sheets

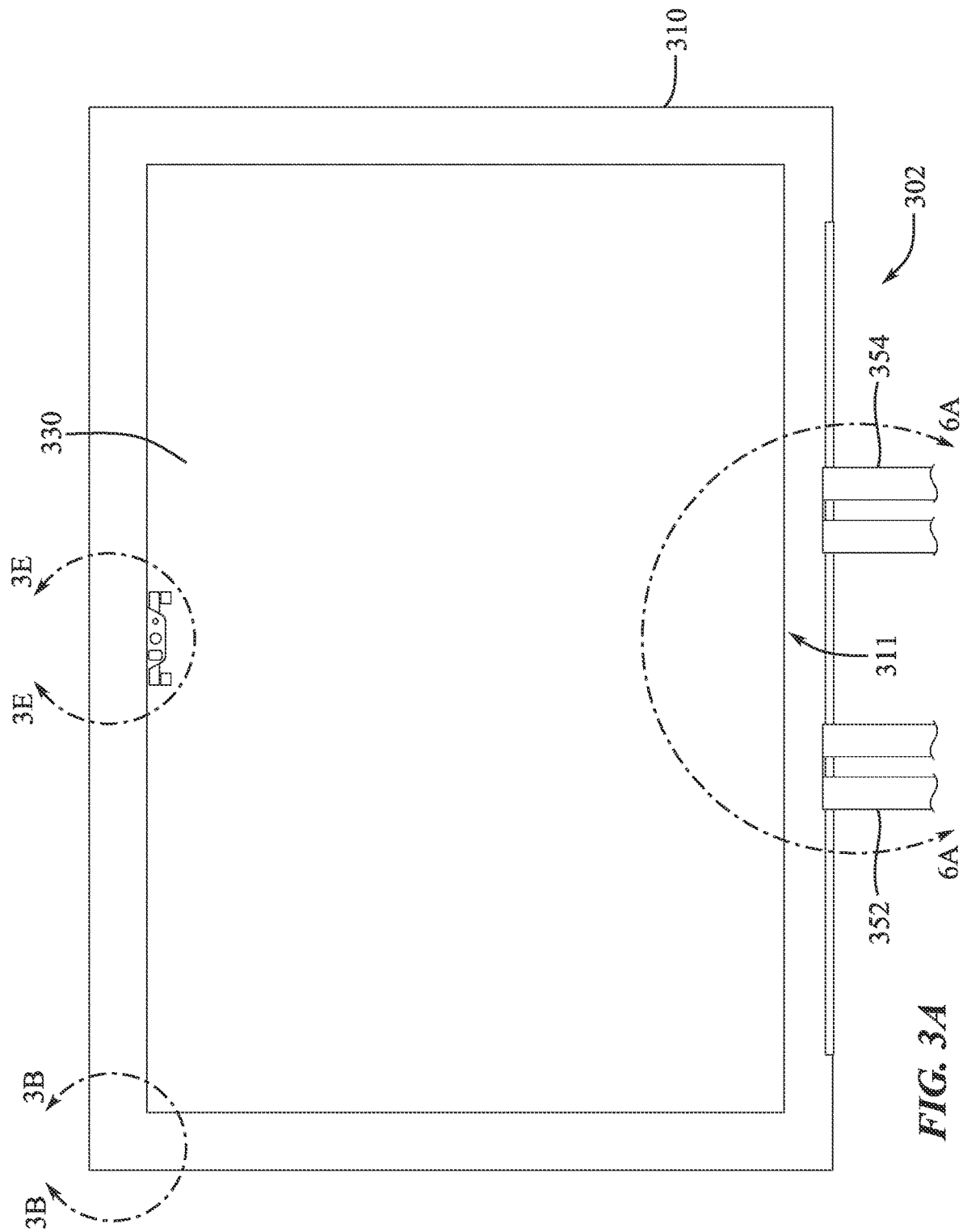

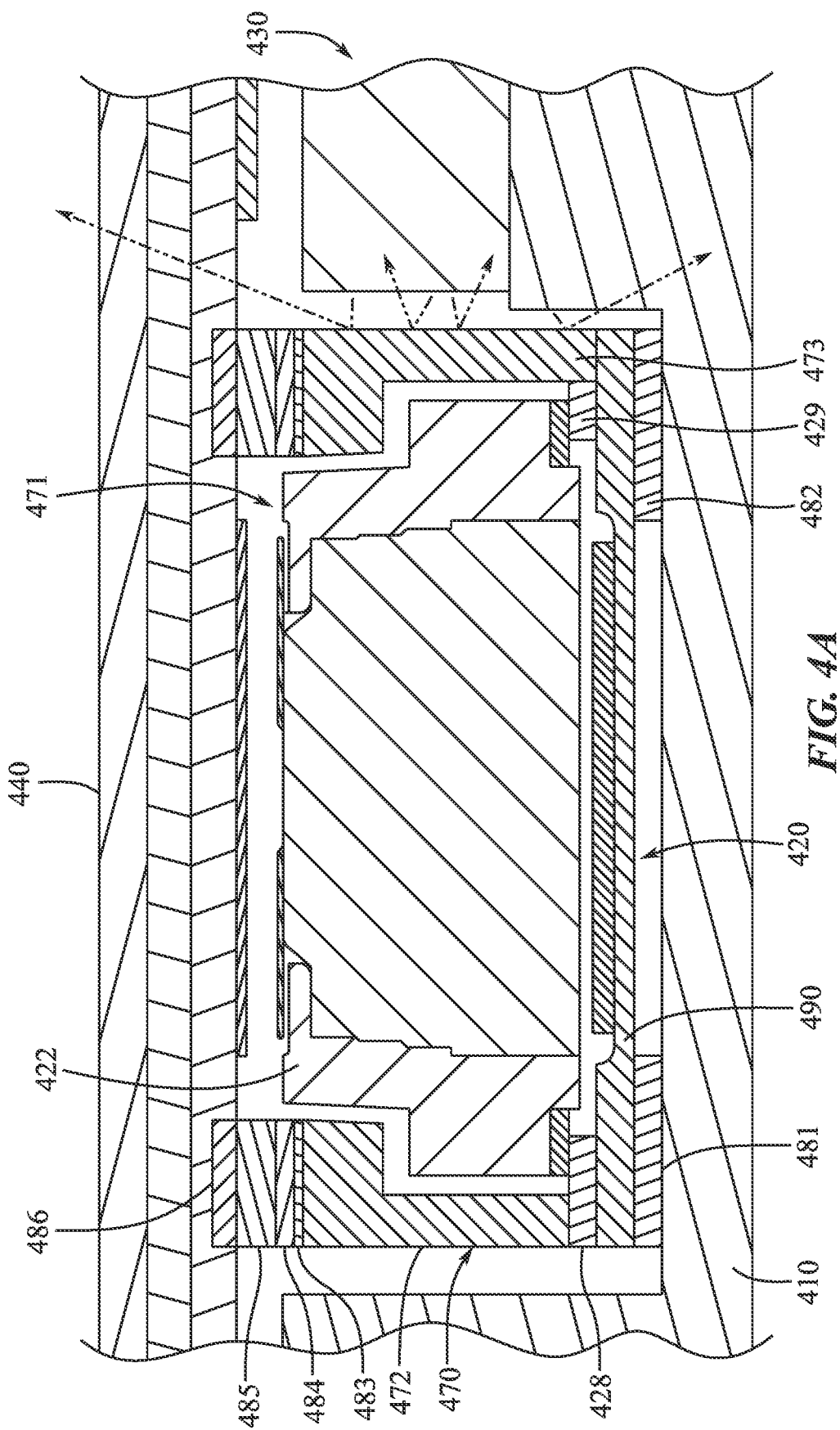

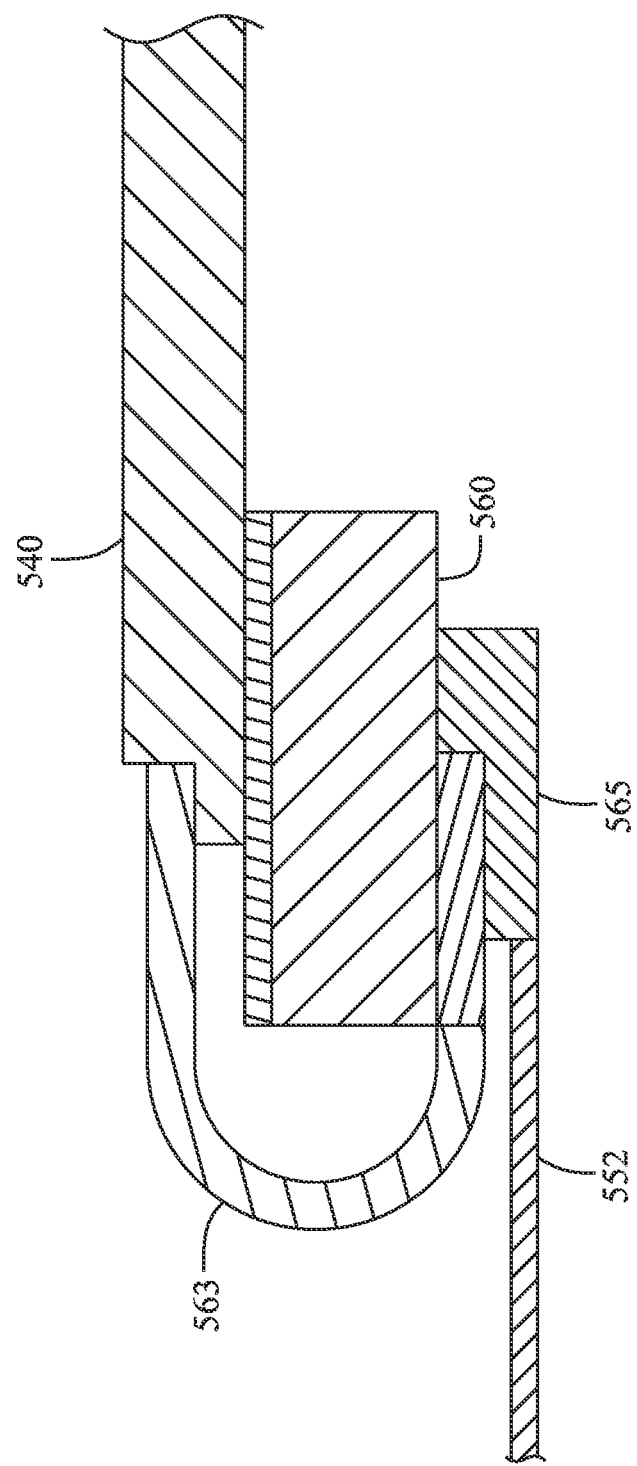

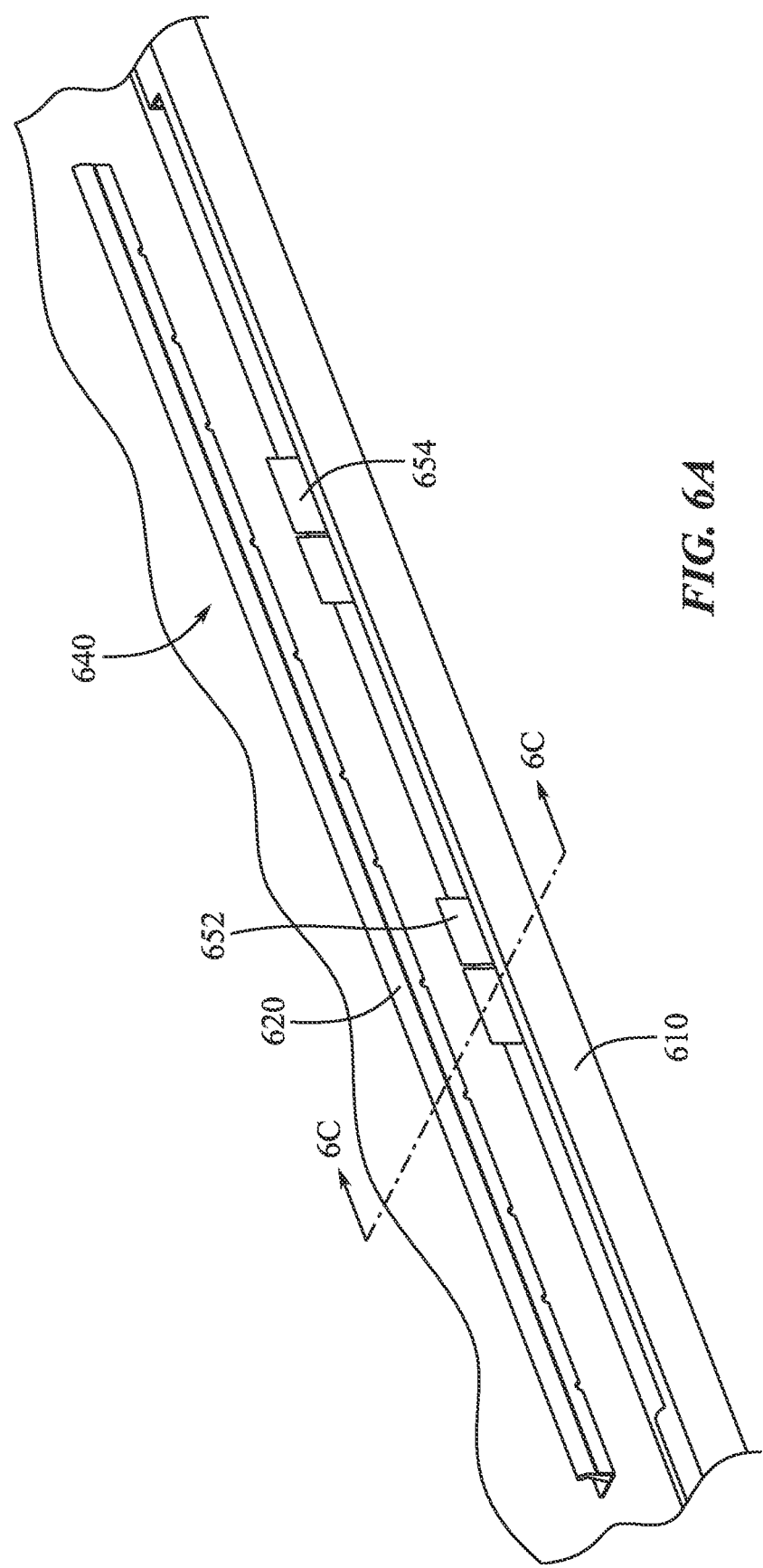

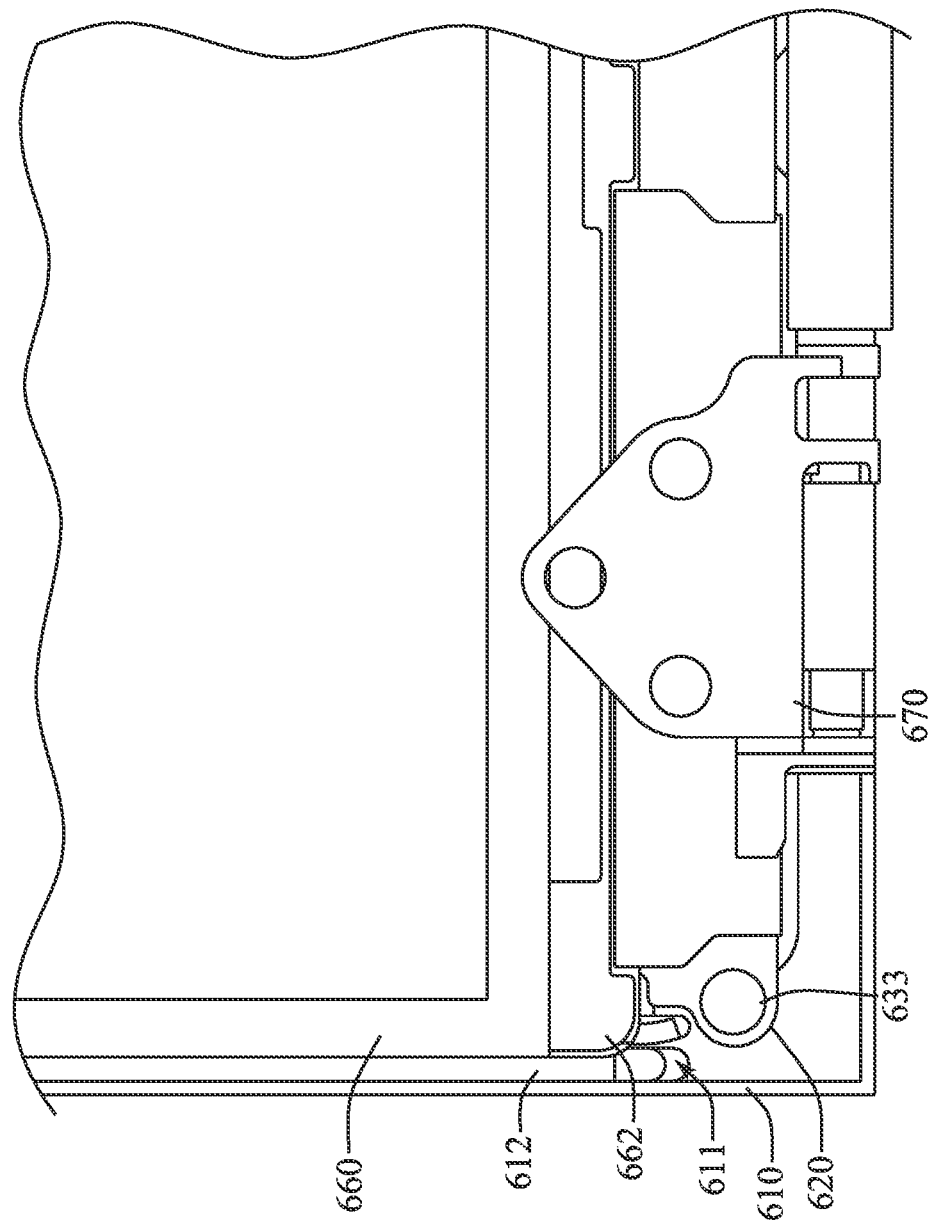

ELECTRONIC DEVICE DISPLAY

CROSS-REFERENCE TO RELATED APPLICATION(S)

This claims priority to U.S. Provisional Patent Application No. 63/133,519, filed 4 Jan. 2021, and entitled "ELECTRONIC DEVICE DISPLAY," the entire disclosure of which is hereby incorporated by reference.

FIELD

The described embodiments relate generally to components for an electronic device. More particularly, the present embodiments relate to components and structures for electronic devices including displays.

BACKGROUND

The components of an electronic device, for example, a housing of an electronic device and associated components, can include structures having features tailored to the specific purposes for which they are employed. The components can be configured to provide physical support or protection to other components of the electronic device, provide for thermal transmission, provide for airflow through or around the electronic device, or provide for any number of additional purposes. The components of the electronic device can be designed to provide a unique and pleasing look and feel to a user. Additionally, the components can be designed to optimize one or more dimensions of the device, such as an amount of active area of the device.

Recent advances in electronic devices have enabled high levels of performance. Existing components, structures, and methods of assembly for electronic devices, however, can limit the levels of performance of such devices. For example, traditional housings can limit the amount or relative percentage of active area of a display. Similarly, traditional methods of device assembly can include features or components that inhibit device performance, even when non-traditional housing structures are used. Further, traditional structures and methods used to assemble an electronic device can undesirably limit one or more dimensions of the device relative to the individual dimensions of each component. In this regard, further tailoring of components for electronic devices can provide additional or enhanced functionality, desired dimensions, and pleasing aesthetic features.

SUMMARY

According to some aspects of the present disclosure, an electronic device can include a housing including a trim, the trim at least partially defining an orifice and a portion of an exterior surface of the electronic device. A display cell can be positioned at the orifice and secured to the housing, the display cell being in contact with the trim.

In some aspects, the housing can further include an enclosure at least partially defining an internal volume, the enclosure including a sidewall, wherein the sidewall defines a channel and at least partially defines the exterior surface. The trim can be disposed in the channel and extend beyond the portion of the exterior surface defined by the sidewall. The trim can fix a position of the display cell along an axis normal to the orifice. The trim can define a mounting surface and a visible surface, the mounting surface being parallel to and offset from the visible surface, the display cell can contact the mounting surface, and the visible surface at least partially defines the exterior surface of the electronic device. The mounting surface can extend around a perimeter of the orifice and has a width of between about 0.1 mm and about 1 mm. The display cell can be spaced apart from a protrusion of the trim that defines the visible surface by a width of between about 0.1 mm and about 0.3 mm. The display cell can be secured to the enclosure by a reworkable adhesive. The reworkable adhesive can include a stretch releasable adhesive, and the enclosure can at least partially define an access point where the stretch releasable adhesive is in communication with an ambient environment. The enclosure can define a cavity disposed at least partially beneath the trim, and a magnet can be disposed in the cavity. The device can further include a backlight component underlying the display cell, the backlight component disposed in an internal volume defined by the housing. The backlight component can define a notch and a camera module positioned at the notch adjacent to the trim and under the display cell, the camera module including a camera and a light-blocking element positioned between the camera and the backlight component. The housing can be a display portion housing and the electronic device can further include a base portion, the display portion housing rotatably mounted to the base portion. The enclosure can include a back wall opposite the display cell and a front wall adjacent to an edge of the display cell, the front wall defining a portion of the exterior surface parallel to a surface of the display cell. The device can further include a flexible connector in electrical communication with the display cell and with an electronic component disposed in an internal volume defined by the base portion. The device can further include a flexible connector in electrical communication with the display cell and with an electronic component disposed in an internal volume defined by the base portion. The display cell can include a glass or ceramic cover that at least partially defines the exterior surface of the electronic device. The backlight component can define an aperture surrounded by an active area of the backlight component, and the housing can include a post disposed in the aperture.

According to some aspects, an electronic device can include a display portion rotatably mounted to a base. The display portion can include a display housing, a first electronic component disposed in a display internal volume at least partially defined by the display housing, a flexible connector electronically coupling the first electronic component with a second electronic component disposed in a base internal volume at least partially defined by the base, and a grounding component disposed in the display internal volume. The grounding component can electrically ground the flexible connector to the display housing.

In some aspects, the display portion can include a display cell defining a portion of an exterior surface of the electronic device, the display housing can include a front wall adjacent to a portion of a perimeter the display cell and sidewalls adjacent to a remainder of the perimeter, the front wall defining a portion of the exterior surface parallel to a surface of the display cell. The first electronic component can include a controller disposed in a portion of the display internal volume at least partially defined by the front wall and adjacent to the display cell. The flexible connector can be a first flexible connector, the electronic device can include a second flexible connector electronically coupling a third electronic component disposed in the display internal volume with a fourth electronic component disposed in the base internal volume. The grounding component can include a metal bracket affixed to the display housing. The electronic device can further include a conductive gasket secured to the display housing and in contact with the flexible connector, and the grounding component can exert a pressure on the flexible connector against the conductive gasket.

According to some aspects, a camera module for an electronic device can include a base, a flexible electrical connector secured to the base, and an enclosure overlying and secured to the flexible electrical connector at a first location. The enclosure can be secured to the base at a second location, the enclosure and the base at least partially defining a camera volume, and a camera component can be disposed on the base in the camera volume.

In some aspects, the enclosure can include a first sidewall secured to the flexible electrical connector at the first location, and a second sidewall opposite the first sidewall, the second sidewall secured to the base at the second location. The first sidewall and the second sidewall can at least partially define an opening disposed over the camera component. The enclosure can define a portion of an exterior surface of the camera module, and the portion of the exterior surface can have a reflectivity of machined aluminum. The enclosure includes a surface coating at the portion of the exterior surface. The enclosure can be secured to the flexible electrical connector with an adhesive. The adhesive can be substantially opaque. The enclosure can include a plastic material having a light reflecting material disposed therein. The light reflecting material can include a ceramic material. The camera module can further include an ambient light sensor disposed in the camera volume. The flexible electrical connector can be in communication with a processor disposed on the base. An electronic device can include the camera module. The electronic device can include a housing at least partially defining an internal volume, and a backlight component disposed in the internal volume, the backlight component defining a notch, the camera module can be disposed in the internal volume adjacent to the backlight component at the notch.

BRIEF DESCRIPTION OF THE DRAWINGS

The disclosure will be readily understood by the following detailed description in conjunction with the accompanying drawings, wherein like reference numerals designate like structural elements, and in which:

FIG. 3A shows a front view of a display portion of an electronic device.

FIG. 4A shows a cross-sectional view of a module of an electronic device,

FIG. 5B shows a cross-sectional view of the display component of FIG. 5A.

FIG. 6A shows a perspective view of a region of the display portion of the electronic device of FIG. 3A.

FIG. 6B shows a front view of a region of the display portion of the electronic device of FIG. 6A.

DETAILED DESCRIPTION

Figure 1:
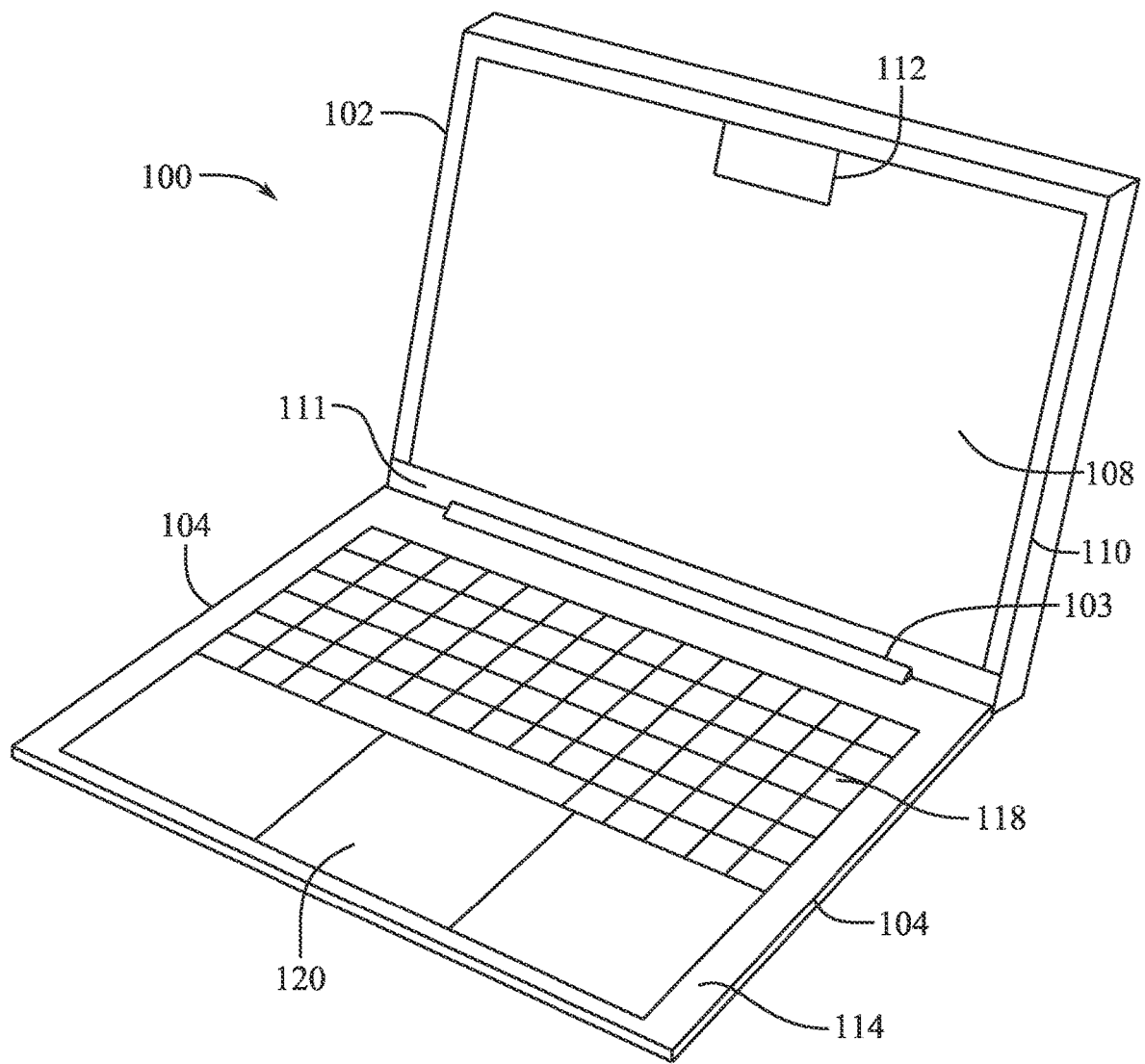
FIG. 1 shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

One aspect of the present disclosure relates to an electronic device, such as a laptop computer, including a display portion rotatably attached or mounted to a base portion. The display portion can include a display housing that includes an enclosure which at least partially defines an internal volume and an exterior surface of the display portion. The display housing can also include a trim that can be positioned in a channel defined by the enclosure and that can define an orifice and a portion of the exterior surface of the display portion. A backlight component defining a notch can be positioned in the internal volume, and a camera module can also be positioned in the internal volume adjacent to the backlight component at the notch. A display cell can be positioned at the orifice in contact with the trim and over the backlight component and the camera module. The display cell can be secured to the enclosure, for example, with a reworkable adhesive. The trim can act as a datum and can fix the position of the display cell in one or more directions, such as in a direction normal to the orifice.

The architecture and components of the electronic devices, including display portions, described herein, can allow for configurations of an electronic device that can maximize the active area of a display or display cell in a display portion, while still providing visual access to one or more components of the device that may need to be positioned at the display portion facing a user in order to achieved desired levels of functionality. In traditional electronic device configurations, such as with traditionally designed laptops that include a user-facing camera, the display portion can include a relatively large region or bezel above the active area of the display cell that can extend across an entire width of the display portion to house the camera. Additionally, traditional laptop display portion designs can include relatively large bezels around most or all of the periphery of the display cell to hide components for mounting the display cell the display portion housing, for example, components that can fix the position of the display cell in one or more directions relative to the display housing.

Further, the need to transfer relatively large amounts of data and signals from the display cell to one or more controller in the base portion of a traditionally designed laptop can require relatively large and numerous electrical connectors to pass between the display portion and the base portion. The inability to pass fixtures or other components through these flexible connectors can mean that the bezel region at the bottom of the display portion adjacent to the display cell may need to be undesirably large.

In contrast, the components, features, and configurations described herein can allow for display portion designs that maximize the user-facing active area of the display, while minimizing or even eliminating the bezels adjacent to the display cell and maintaining the same or even improving levels of display performance. For example, the display portions described herein can have relatively small or even no bezel area around at least two edges or sides of a display cell, with a relatively small bezel or chin disposed along a bottom edge of the display cell. In some examples, the display portion can include one or more user-facing components, such as a camera and ambient light sensor, that can be positioned at an edge of the display, but that may not require a bezel or inactive region that extends across an entire dimension of the display.

In some examples, an electronic device including two portions that are moveable relative to one another can have an open position and a closed position. The electronic device can be designed to occupy space above a support surface with an edge of a display portion when in an open position. The electronic device can be considered to be in an open position when the display portion is rotated or moved away from a base portion, such that the display portion is no longer substantially parallel with the base portion, or contacting the base portion at locations other than the location or locations of attachment.

In the description herein, the terms "first portion," "display portion," and "upper portion" can refer to a lid portion of a computing device. Generally, a lid portion of a computing device is configured to be in a substantially upright position for a user to view a display housed in the lid portion while the device is being operated. In some examples, however, the lid portion can assume any desired position relative to the base portion. In the description below, the terms "second portion," "main housing," "base portion," and "lower portion" can refer to a base of a computing device that can be moveably affixed to the lid portion, and that generally includes connections to input components for user interaction with the computing device.

These and other examples are discussed below with reference to FIGS. 1-7C. However, those skilled in the art will readily appreciate that the detailed description given herein with respect to these Figures is for explanatory purposes only, and should not be construed as limiting.

FIG. 1 shows a front-facing perspective view of an electronic device 100. The electronic device 100 can be a laptop computer or a notebook computer, but this is merely one representative example of a device according to the present disclosure. The electronic device 100 can, for example, correspond to a portable media player, a media storage device, a portable digital assistant ("PDA"), a tablet computer, a computer, a mobile communication device, a GPS unit, a remote control device, and other similar electronic devices. The electronic device 100 can be referred to as an electronic device, or a consumer device. The electronic device 100 can include a housing having a base portion 104, which can be moveably, pivotally, or rotatably connected or affixed to a display portion 102, for example, by way of a hinge assembly 103. The display portion 102 and the base portion 104 can be referred to as different sections or portions of a single housing of the electronic device 100. The display portion 102 can pivot or otherwise move with respect to the base portion 104 from a closed position to an open position, and back again with the aid of the hinge assembly 103. Although illustrated as being pivotally attached to the base portion 104, in some examples, the display portion 102 can move in any manner desired relative to the base portion 104. For example, the display portion 102 can laterally slide relative to the base portion 104. In some examples, the display portion 102 can move in any combination of directions relative to the base portion 104. For example, the display portion 102 can be rotated relative to the base portion 104, and/or can slide laterally relative to the base portion 104.

In the closed position, the display portion 102 can be positioned substantially on top of or over at least a portion of a top surface 114 of the base portion 104. In some examples, the display portion 102 can directly contact the top surface 114 of the base portion 104. In some examples, the display portion 102 can be substantially parallel to the top surface 114 of the base portion 104 when in the closed position. In the open position, the display portion 102 can be positioned at an angle relative to the top surface 114 of the base portion, for example, generally perpendicular to the top surface 114 of the base portion 104. In some examples, in an open position, the display portion 102 and the base portion 104 can form a generally obtuse angle. In some examples, the electronic device 100 can still be considered to be in an open position when an angle of less than 90 degrees is formed between the display portion 102 and the base portion 104.

In some examples, the base portion 104 can include various user input devices such as a keyboard 118 and a touchpad 120, which can, for example, receive touch or other finger gesturing input from a user. In some examples, one or more of the input components 118, 120 can at least partially define the top surface 114, and can at least partially be positioned in an aperture or apertures defined by the base portion 104. The base portion 104 and the display portion 102 can each define internal volumes, chambers, or cavities that house internal components of the electronic device 100. The display portion 102 can further define an aperture or an opening, and can include a display 108 disposed therein. In some examples, the display portion 102 can include a rear housing or a rear cover 110 that can be disposed opposite the aperture and/or the display 108. Thus, the display portion 102 and the base portion 104 can function as housings for internal components.

The display 108 can be any form of display, component, or device used to display visual content to a user. For example, the display 108 can be an LED display, an OLED display, an LCD display, or the like. In some examples, the display 108 can be any form of display now known in the art, or as may be developed in the future. In some examples, the display 108 can be a touch screen display, or can have touch detecting capabilities. In some examples, however, the electronic device can be capable of detecting a user's touch, and/or a position of an appendage of the user, by components other than the display 108. In some examples, the display portion 102 can also include one or more user-facing components, such as a camera module 112, that can be disposed at a notch defined by one or more components of the display 108. Further details of the electronic device 100 are provided below with reference to FIGS. 2A-2E.

Figure 2A:
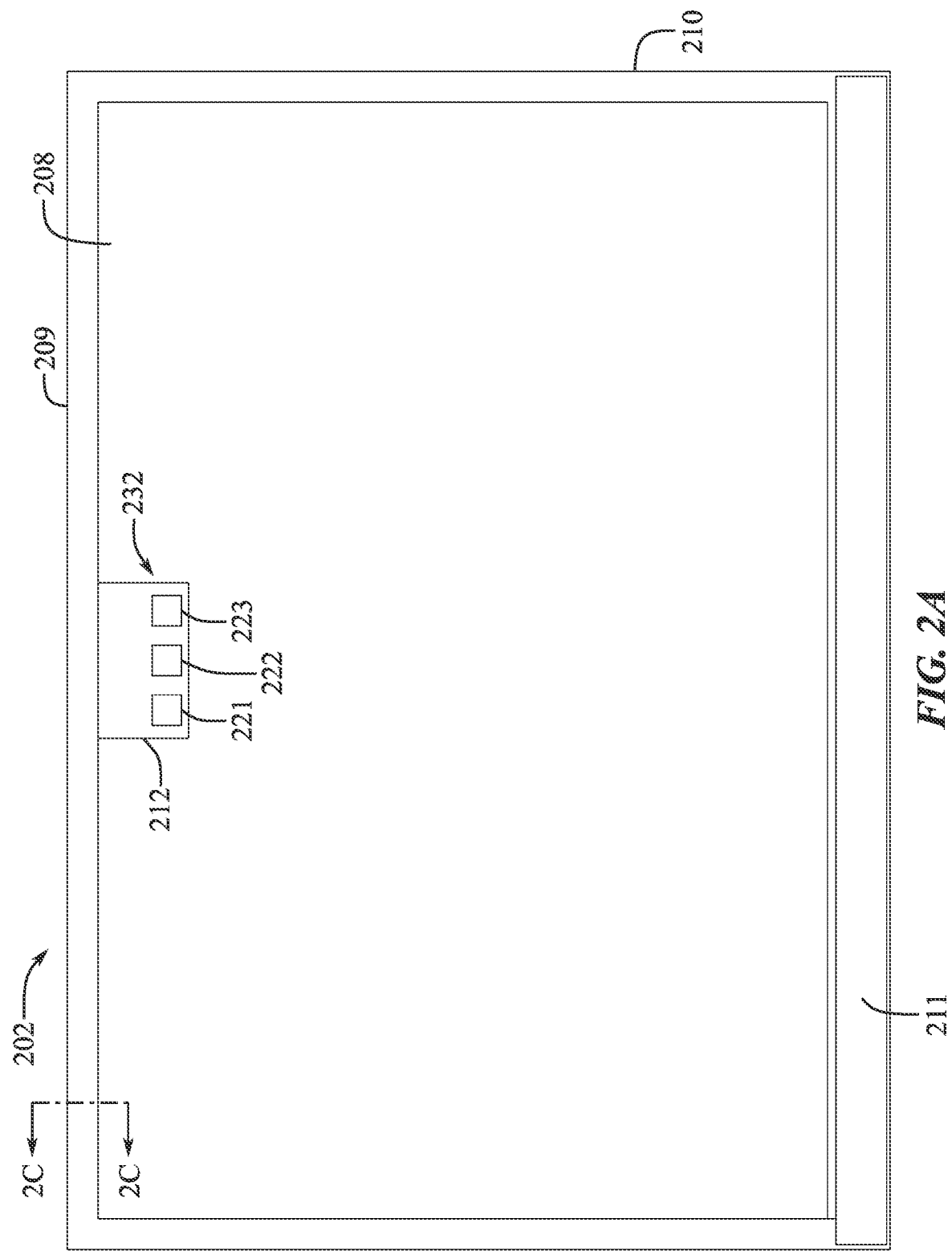
FIG. 2A shows a front view of a display portion of an electronic device.

FIG. 2A illustrates a front view of a display portion 202 of an electronic device. The electronic device can be substantially similar to, and can include, some or all of the features of any of the electronic devices described herein, such as electronic device 100. In some examples the display portion 202 can include a display housing 210 that can at least partially define an internal volume and a display 208 that can be at least be partially disposed in the internal volume and affixed or secured to the display housing 210. The display housing 210 can further include a trim 209 that can at least partially define an orifice and at least a portion of the exterior surface of the display portion 202. The display 208 can be positioned at the orifice and in contact with the trim 209, as described further herein.

The display housing 210 can also include a front wall 211, otherwise referred to as a chin, that can be adjacent to the orifice and an edge of the display 208. In some examples, the portion of the exterior surface defined by the front wall 211 can be substantially parallel to, flush, co-planar and/or aligned with the portion of the exterior surface defined by the display 208. As can be seen, the active portion of the display 208 can make up a large majority of the user-facing surface of the display portion 202, with the display portion 202 having relatively thin or small bezels extending around the display 208, except along the edge of the display 208 adjacent to the front wall 211. Further, the display 208, or a portion thereof, can define an indentation, notch, or other feature 232 and one or more components or modules can be disposed or positioned at the notch 232. For example, a camera module 212 can be positioned at the notch 232. This geometry, with the active area of the display 208 or a component thereof at least partially surrounding a module or component, such as camera module 212, can allow for the maximization of active display area while still providing room for components or modules that may need to be positioned at a user-facing surface of the display portion 202.

In some examples, and as described further herein, the camera module 212 can include any number of components. These components can, in some examples, be positioned at a user-facing surface to achieve desired levels of functionality. For example, the camera module 212 can include a camera component 222, a camera indicator light 223, and a sensor 221, such as an ambient light sensing component. Further details of the construction and architecture of the display portion 202 are provided below with reference to FIG. 2B.

Figure 2B:
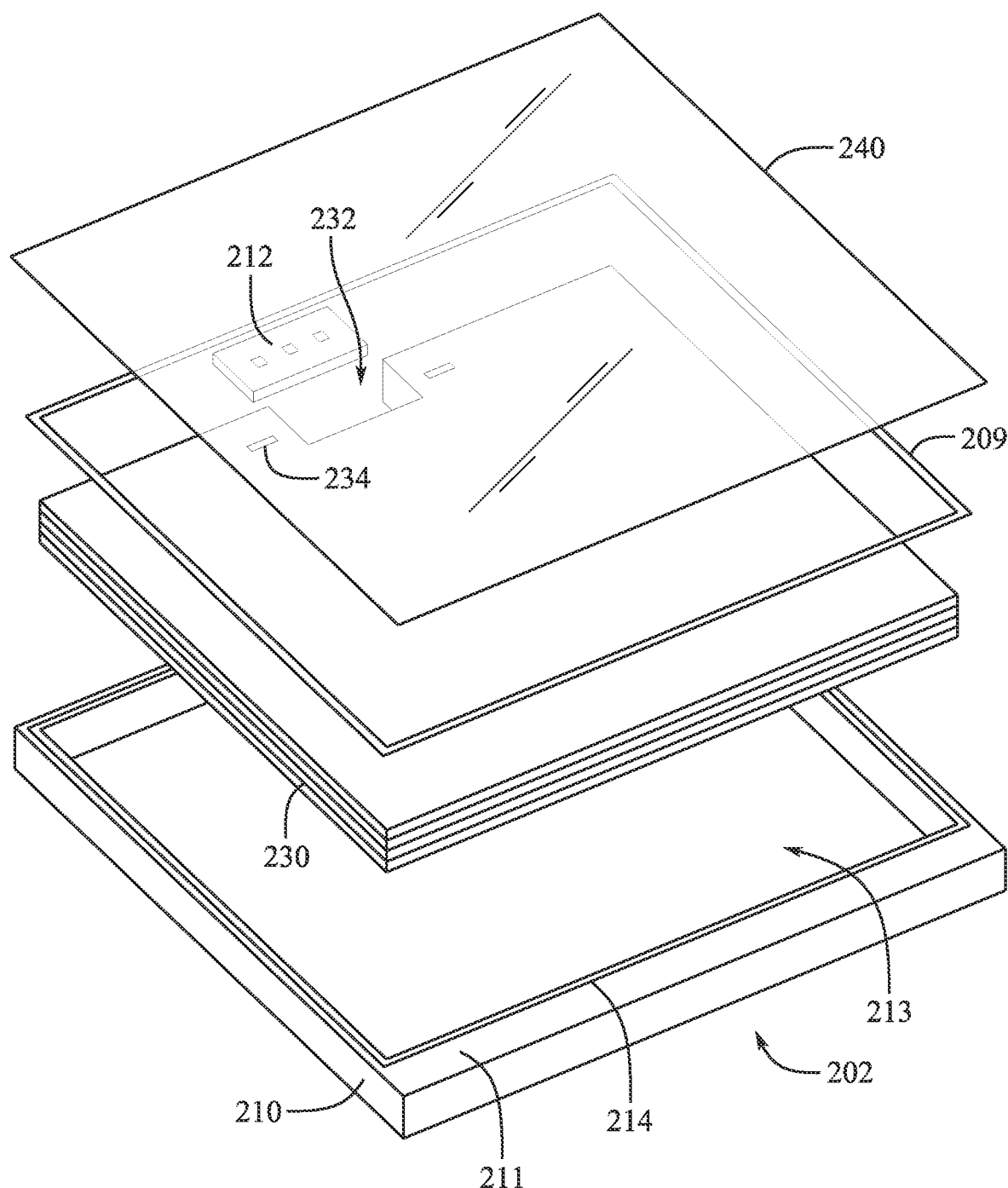
FIG. 2B shows an exploded view of the display portion of the electronic device of FIG. 2A.

FIG. 2B illustrates an exploded view of the display portion 202, showing the display housing 210, the trim 209, a backlight component 230, and a display cell 240. In some examples, the backlight component or components 230 and the display cell 240 can together be considered a display 208. As can be seen, the display housing 210 can define a front wall 211, and can at least partially define an internal volume 213. In some examples, the display housing can include a metallic material, such as titanium, stainless steel, and/or aluminum or alloys thereof. In some examples, the display housing 210 can be a substantially unitary or singular component. In some examples, however, the display housing 210 can include multiple components that can be joined or otherwise secured together to form the display housing 210. The display housing 210 can also be referred to as an enclosure or display enclosure, and can include sidewalls that can at least partially define the display internal volume 213. In some examples, the sidewalls can further define a channel 214 that can at least partially surround the display internal volume 213.

In some examples, and as described herein, a backlight component 230 can be at least partially disposed in the display internal volume 213. The backlight component 230 can define a notch 232 that can be positioned along an edge of the backlight component 230. In some examples, a camera module 212 can be at least partially disposed in the display internal volume 213 and positioned at the notch 232. The backlight component 230 can also define other features, for example, that can aid in the mounting or positioning of the backlight component 230 with respect to one or more other components, such as the display housing 210. For example, the backlight component 230 can define one or more apertures 234 that can meet with or receive features, such as posts (not shown) that are affixed to the display housing 210.

In some examples, the display housing 210 can further include a trim or a trim component 209. The trim 209 can at least partially define an orifice and a portion of the exterior surface of the display portion 202. In some examples, the trim 209 can be disposed in the channel 214 and can at least partially surround the display internal volume 213. The display portion 202 can further include a display cell 240 that can be positioned at the orifice at least partially defined by the trim 209. The display cell 240 can be secured to the display housing 210. In some examples, the display cell 240 can be in contact with the trim 209. In some examples, the display cell 240 can include a liquid crystal display (LCD) cell, although any form of display cell can be used as desired, such as an LED display cell, an OLED display cell, a plasma display cell, a quantum dot display cell, and other display cells or combinations thereof. Further details of the construction and architecture of the display portion 202 are provided below with reference to FIG. 2C.

Figure 2C:
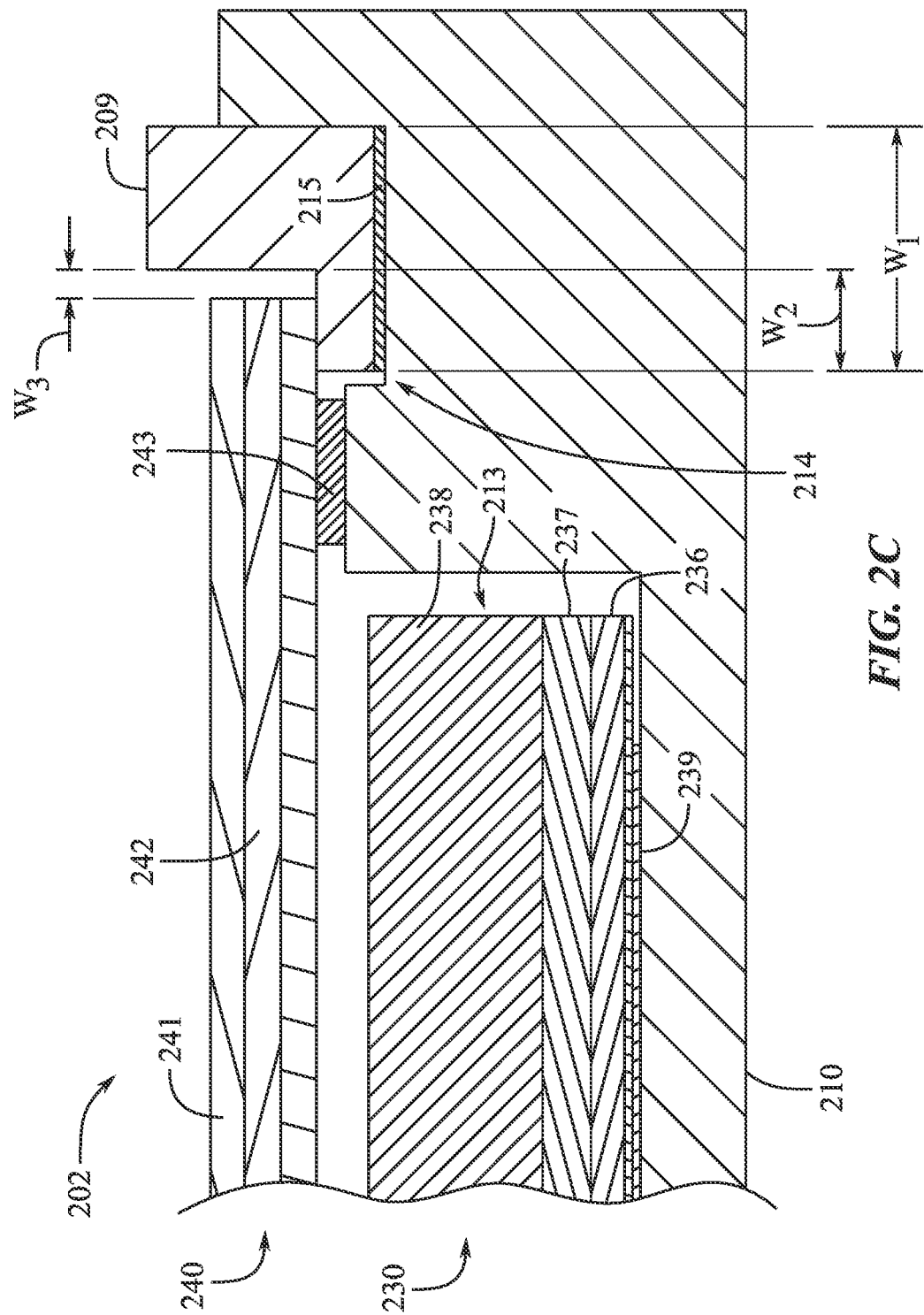
FIG. 2C shows a cross-sectional view of a region of the display portion of the electronic device of FIG. 2A.

FIG. 2C shows a cross-sectional view of a region of the display portion 202 shown in FIG. 2A. As described with respect to FIG. 2B, the display portion 202 can include a display housing 210 that can at least partially define a display internal volume 213 with a backlight component 230 disposed in the display internal volume 213. In some examples, the backlight component 230 can be secured or affixed to the display housing 210, such as a back wall of the display housing 210, by an adhesive 239. Further, as shown, the backlight component 230 can include or be formed of multiple layers or components, such as a light emitting component 236, for example a light emitting diode (LED or micro-LED array). The backlight component 230 can also include one or more layers or components to enhance the light emitting capabilities or spectrum of the light emitting component 236, such as one or more fluorescent, phosphorescent, and/or polarizing layers 237. The back light component 230 can also include one or more diffusing layers 238.

As described herein, the display housing 210, for example a sidewall portion thereof, can define a channel 214. In some examples, a trim 209 can be disposed in the channel 214 and can be secured or affixed to the display housing 210 by an adhesive 215, or any other technique. The trim 209 can include a portion that extends beyond the exterior surface defined by the display housing 210. In some examples, the trim 209 can have a stepped or tiered geometry defining multiple surfaces that can be offset relative to another. For example, as shown, the trim 209 can define a visible surface that forms a portion of the exterior surface of the display portion 202, and a mounting surface that can be substantially parallel to and offset from the visible surface. In some examples, the display cell 240 can be in contact with the mounting surface of the trim 209.

In some examples, the adhesive 215 and/or any of the other adhesives described herein, such as adhesive 243 described below, can include a reworkable adhesive. In some examples, this adhesive 215 can be a reworkable pressure sensitive adhesive, such as a reactive hot melt pressure sensitive adhesive. Further, the adhesive 215 can be applied as a single component material in a warm or heated state, whereupon it can subsequently cool and/or react with ambient moisture to fix the trim 209 to the housing 210. In some examples, the adhesive 215 can include a polymer or polymers capable of one or more forms of cross-linking, and in a cooled state can include a cross-linked urethane polymer network. In some examples, the adhesive 215 can include polyurethane. The adhesive 215 can adhere to the materials of the trim 209 and housing 210, including metals such as aluminum or stainless steel, ceramics such as glass, and plastics.

In some examples, the display cell 240 can be positioned at the orifice at least partially defined by the trim 209 and can be secured to the display housing 210, for example, with an adhesive 243. In some examples, the adhesive 243 can be in the form of a bead of adhesive material and can be positioned substantially entirely around a perimeter of the internal volume 213 and/or display cell 240. In some example, however, the adhesive 243 can be positioned at one or more locations around a periphery or edge region of the display cell 240. The display cell 240 can overlie and at least partially define the display internal volume 213. In some examples, the display cell 240 can include multiple components or layers. For example, the display cell 240 can include a display layer 242, such as an LCD or other display layer 242, and a transparent cover 241. The transparent cover 241 can define an exterior surface of the display cell 240, and thus, a portion of the exterior surface of the display portion 202. In some examples, the transparent cover can include any substantially transparent material or materials, such as plastic, glass, ceramic materials, or combinations thereof.

In some examples, the display cell 240 can be in contact with the mounting surface of the trim 209. In some examples, this portion of the trim 209 can serve to fix a position of the display cell 240, for example, during manufacturing of the display portion 202. In some examples, the adhesive 243 can be dispensed onto the display housing 210 in a bead, and the position of the display cell 240 can be fixed along an axis substantially perpendicular or normal to the orifice defined by the trim 209 and/or the mounting surface itself. In this way, the position of the display cell 240 along this axis can be controlled without the need for additional components or manufacturing processes, allowing for a display portion 202 having thin bezels around multiple sides or edges of the display cell 240. In some examples, the adhesive 243 can be a reworkable adhesive, such as a releasable adhesive or stretch releasable adhesive. Further, in some examples, the display housing or enclosure 210 can define one or more access points, such as apertures, slots, or orifices, where the adhesive 243 can be in communication with the ambient environment. These access points can allow for access to the adhesive from the ambient environment to physically stretch, pull, or otherwise remove the adhesive to release the display cell 240 from the housing 210.

In some examples, the adhesive 243 can have a thickness of about 50 microns to about 1000 microns when the display cell 240 is affixed thereto. In some examples, the adhesive 243 can have a thickness of about 100 microns to about 500 microns, or about 150 microns to about 250 microns, for example about 250 microns. In some examples, the adhesive 243 can include polyurethane. In some examples, the adhesive 243 can have a hardness of between about 50 and 100 durometer, for example about 75 durometer.

In some examples, the trim 209 can have a width $W_1$ of between about 0.25 millimeters (mm) and about 10 mm, between about 0.5 mm and about 5 mm, or between about 0.75 mm and about 2.5 mm, for example about 1 mm. In some examples, the mounting surface of the trim 209 can have a width $W_2$ that can be between about one quarter and about three quarters of the width $W_1$. In some examples, the width $W_2$ can be between about 0.1 mm and about 1 mm, for example about 0.5 mm. In some examples, the display cell 240 can contact substantially the entire width $W_2$ of the mounting surface. In some examples, however, the display cell 240 may only contact a portion of the mounting surface and there can be a gap between an edge of the display cell 240 and a wall or protrusion of the trim 209 adjacent to the mounting surface. In some examples, the gap can have a width $W_3$ between about 0 mm and about 0.5 mm, or between about 0.1 mm and about 0.3 mm. In some examples, the width $W_3$ can be about 0.2 mm.

Figure 2D:
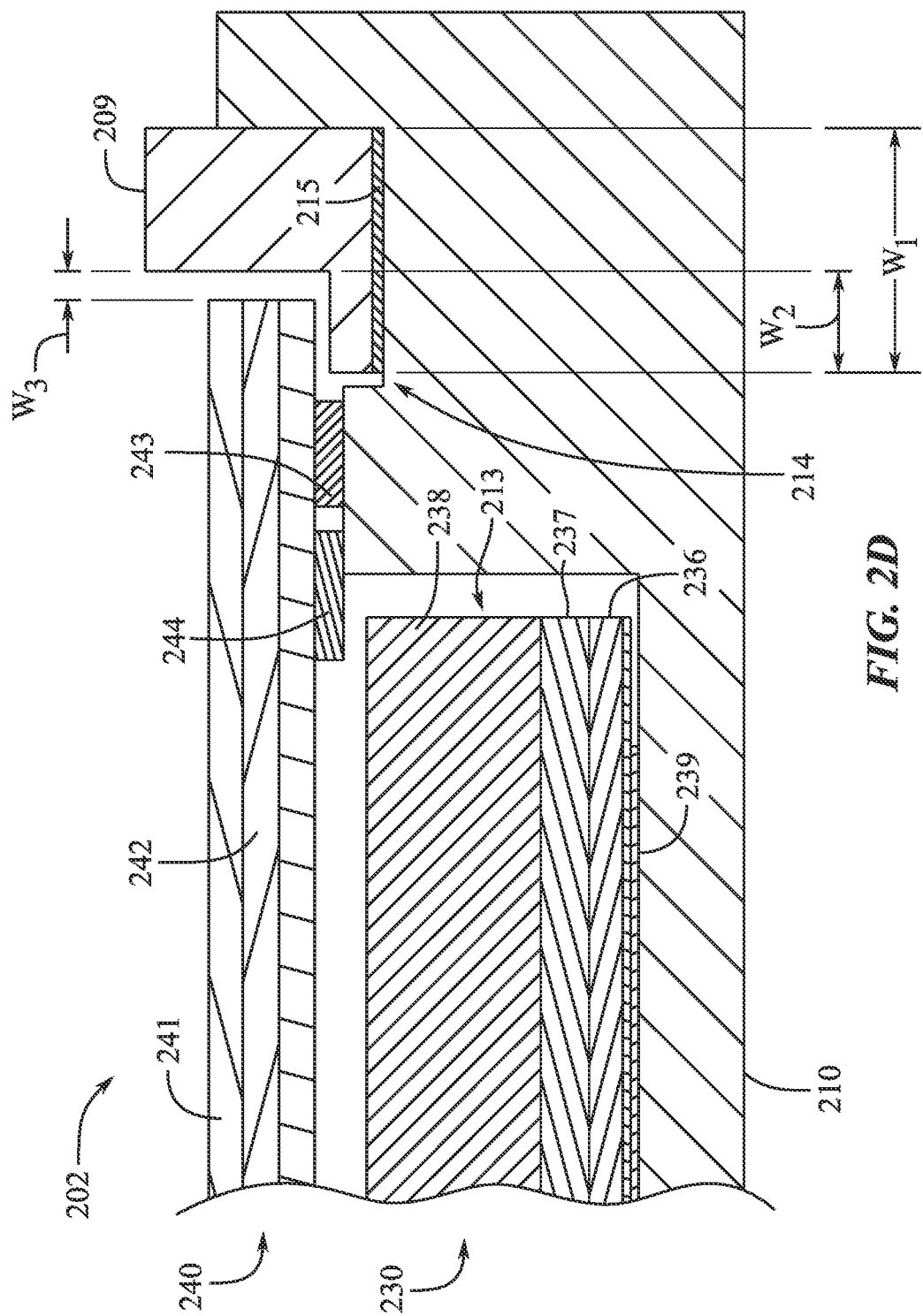
FIG. 2D shows an alternative cross-sectional view of a region of the display portion of the electronic device of FIG. 2A.

FIG. 2D shows a cross-sectional view of an alternative configuration of the region of the display portion 202 shown in FIG. 2A. In some examples, one or more additional components, such as the component 244 can be used to fix, or assist in fixing, the position of the display cell 240, for example, during manufacturing of the display portion 202. As described with respect to FIG. 2C, and in some examples, the adhesive 243 can be dispensed onto the display housing 210 in a bead, and the position of the display cell 240 can be fixed along an axis substantially perpendicular or normal to the orifice defined by the trim 209 and/or the mounting surface itself by the component 244, the trim 209, or a combination of the component 244 and trim 209. Thus, in some examples, the position of the display cell 240 can be fixed by the component 244 and may not be fixed by the trim 209. In some examples, the display cell 240 may not contact the trim 209. In some examples, however, the display cell 240 may contact the trim 209 but may not be fixed in position by the trim 209. Thus, in some examples, the component 244 can act as a shim between a surface of the display cell 240 and a surface of the enclosure 210 to fix the position, or assist in fixing the position of the display cell 240 in at least one direction, and thereby, also fix a thickness of the adhesive layer 243.

Figure 2E:
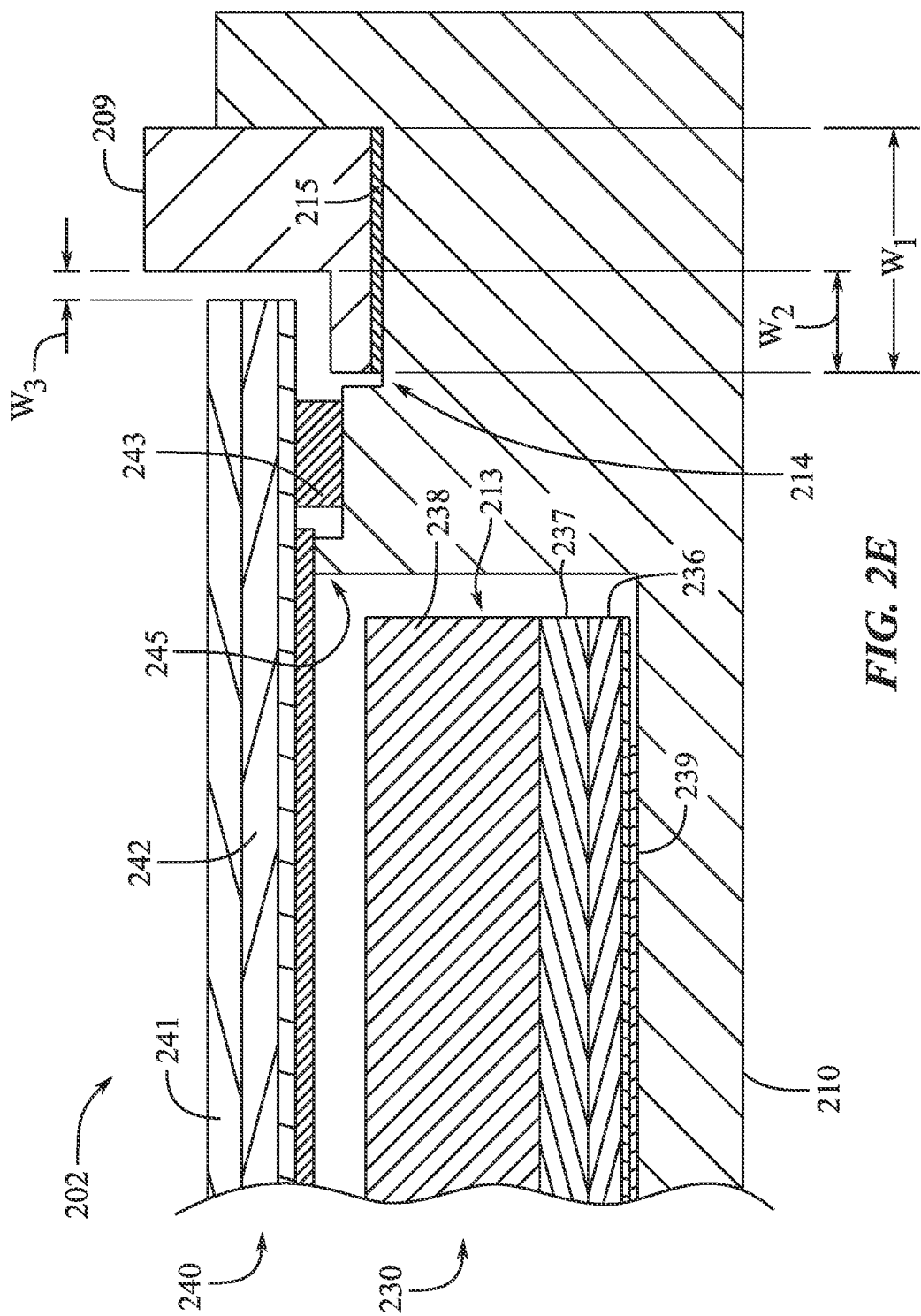
FIG. 2E shows a cross-sectional view of a region of the display portion of the electronic device of FIG. 2A including an assembly component.

FIG. 2E shows a cross-sectional view of an alternative configuration of the region of the display portion 202 shown in FIG. 2A. In some examples, a portion 245 of the housing 210 can be used to fix, or assist in fixing, the position of the display cell 240, for example, during manufacturing of the display portion 202. That is, the portion 245 of the housing 210 can serve to act as a datum for the display cell 240. As described with respect to FIG. 2C, and in some examples, an adhesive 243 can be dispensed onto the display housing 210 in a bead, and the position of the display cell 240 can be fixed along an axis substantially perpendicular or normal to the orifice defined by the trim 209 and/or the mounting surface itself by the portion 245, the trim 209, or a combination of the portion 245 and trim 209. Thus, in some examples, the position of the display cell 240 can be fixed by the portion 245 and may not be fixed by the trim 209. In some examples, the display cell 240 may not contact the trim 209. In some examples, however, the display cell 240 can contact the trim 209 but may not be fixed in position by the trim 209. Thus, in some examples, the portion 245 can act as a shim or datum between a surface of the display cell 240 and a surface of the enclosure 210 to fix the position, or assist in fixing the position of the display cell 240 in at least one direction, and thereby, also fix a thickness of the adhesive layer 243.

In some examples, the portion 245 of the housing 210 can include an integrally formed protrusion, rim, ridge, or other feature of the housing 210. In some examples, the portion 245 can be formed by machining or by performing any subtractive manufacturing process on the housing 210 at one or more desired locations. In some examples, the portion 245 can be formed on the housing 210 by an additive manufacturing process, and/or can be adhered, welded, brazed, or otherwise attached to the housing 210 at a desired location.

Figure 2F:
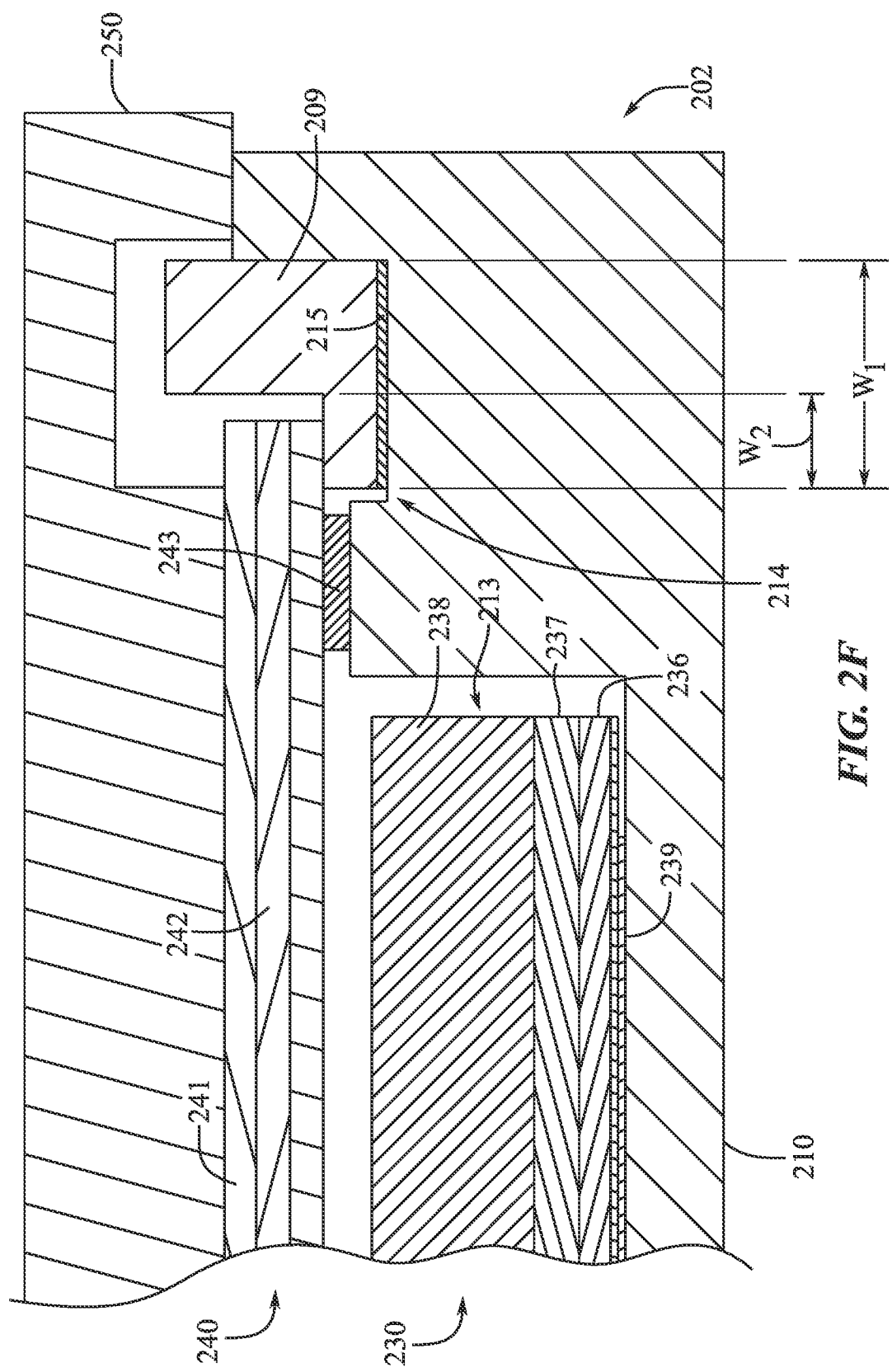
FIG. 2F shows a cross-sectional view of a region of the display portion of the electronic device of FIG. 2A including an assembly component.

FIG. 2F shows a cross-sectional view of a region of the display portion 202 shown in FIG. 2A during a manufacturing or assembly process. In this example, a component, such as a fixture 250, can be used to fix, or assist in fixing the position of the display cell 240 during manufacturing of the display portion 202. In some examples, the fixture 250 can be secured to a surface of the display cell 240, for example, a top surface thereof. In some examples, the fixture 250 can be removably secured to the display cell 240 by any known technique, such as with a removeable adhesive, or with a suction device or a vacuum. The fixture 250 can include a protrusion that is designed to abut a desired surface of the display portion 202, such as a surface of the enclosure 210 when the display cell 240 is in a desired position. In some examples, the fixture 250 can maintain the display cell 240 in this desired position while adhesive 243 that has been disposed onto the display housing 210 in a bead is allowed to cure, harden, or solidify. Once the adhesive 243 has cured or solidified so that the position of the display cell 240 in at least one direction is fixed, the fixture 250 can be removed from the display cell 240.

Although one particular fixture 250 is shown in FIG. 2F, in some examples, the fixture 250 can have any form or shape as desired. In some examples, multiple fixtures 250 can be used to fix or assist in fixing the position of the display cell 240 with respect to the display housing 210. Additionally, the methods and components used to fix the position of the display cell 240 in one or more directions, such as the fixture 250, portion 245, component 244, and/or trim 209 can be used in any combination as desired.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding engagement and retention features, can apply not only to the specific examples discussed herein, but to any number of embodiments in any combination. Various embodiments of electronic devices including components having various features in various arrangements are described below, with reference to FIGS. 3A-4B.

Figure 3B:
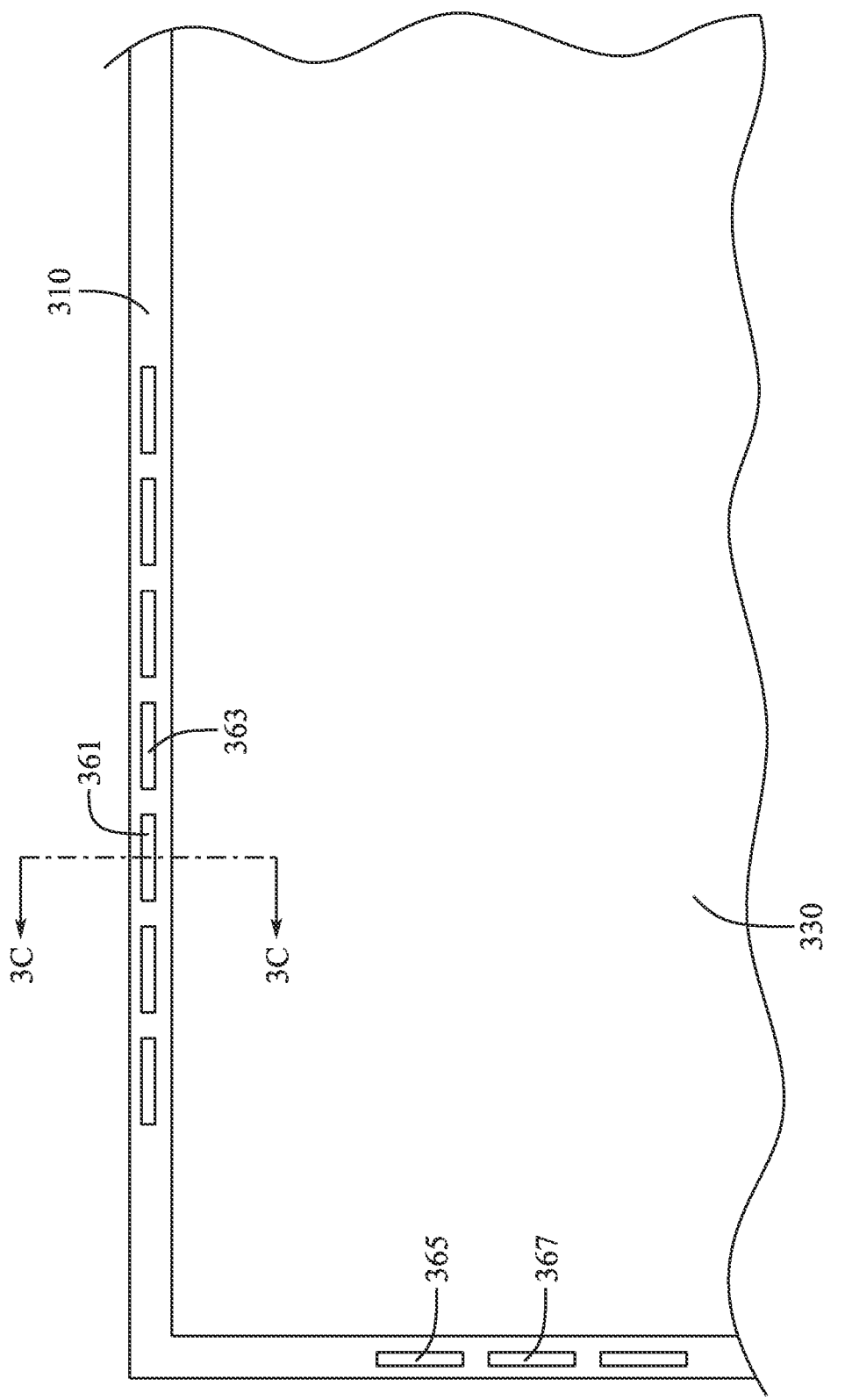
FIG. 3B shows a front view of a region of the display portion of the electronic device of FIG. 3A.

FIG. 3A shows a front view of a display portion 302 of an electronic device. The display portion 302 can be substantially similar to and can include some or all of the features of the display portions described herein, such as display portion 202. As with the display portion 202, the display portion 302 can include a display housing or enclosure 310 that at least partially defines an internal volume and an orifice or aperture. In some examples, this orifice or aperture can be at least partially defined by a trim component, as described herein. The display portion 302 can further include a backlight component 330 that is at least partially positioned in the internal volume. In the example illustrated in FIG. 3A, the display cell, which can overlie the backlight component 330 at the orifice as described herein, is not shown for illustrative purposes. The display housing 310 can include a front wall 311 that can define a front surface that can be flush, in line, co-planar, or parallel with an exterior surface defined by a display cell (not shown). In some examples, the front wall 311 can be unitary or integral with the other portions of the display housing 310. In some examples, however, the front wall 311 can include a separate component that is joined to the display housing 310. In some examples, the front wall 311 can include any desired material, and can include a composite material, such as a first material embedded in a matrix of a second, different material. In some examples, the front can include a ceramic-polymer composite material. The display portion 302 can also include one or more flexible electronic connectors 352, 354 that can be electrically connected to one or more components of the display portion 302, for example, electronic components that can be positioned in the internal volume behind the front wall 311, as described herein. Further details of the construction and architecture of the display portion 302 are provided below with reference to FIG. 3B-3C.

FIG. 3B shows a front view of a region of the display portion 302 illustrated in FIG. 3A. Specifically, FIG. 3B shows a close-up of a top left corner of the display portion 302. In some examples, however, the features described with respect to the region illustrated in FIG. 3B can be positioned at any location or variety of locations on the display housing 310. As described herein, the display housing 310 can include a sidewall that can extend at least partially around the internal volume defined by the display housing 310. In some examples, the sidewall of the display housing 310 can define one or more cavities 361, 363 located along or adjacent to a first edge of the backlight component 330. The display housing 310 can further define additional cavities, such as cavities 365 and 367 that are positioned along or adjacent to one or more other edges of the backlight component 330. Although the cavities 361, 363, 365, and 367 are illustrated as having a relatively oblong or extended shape, in some examples, a cavity can have substantially any desired shape.

Figure 3C:
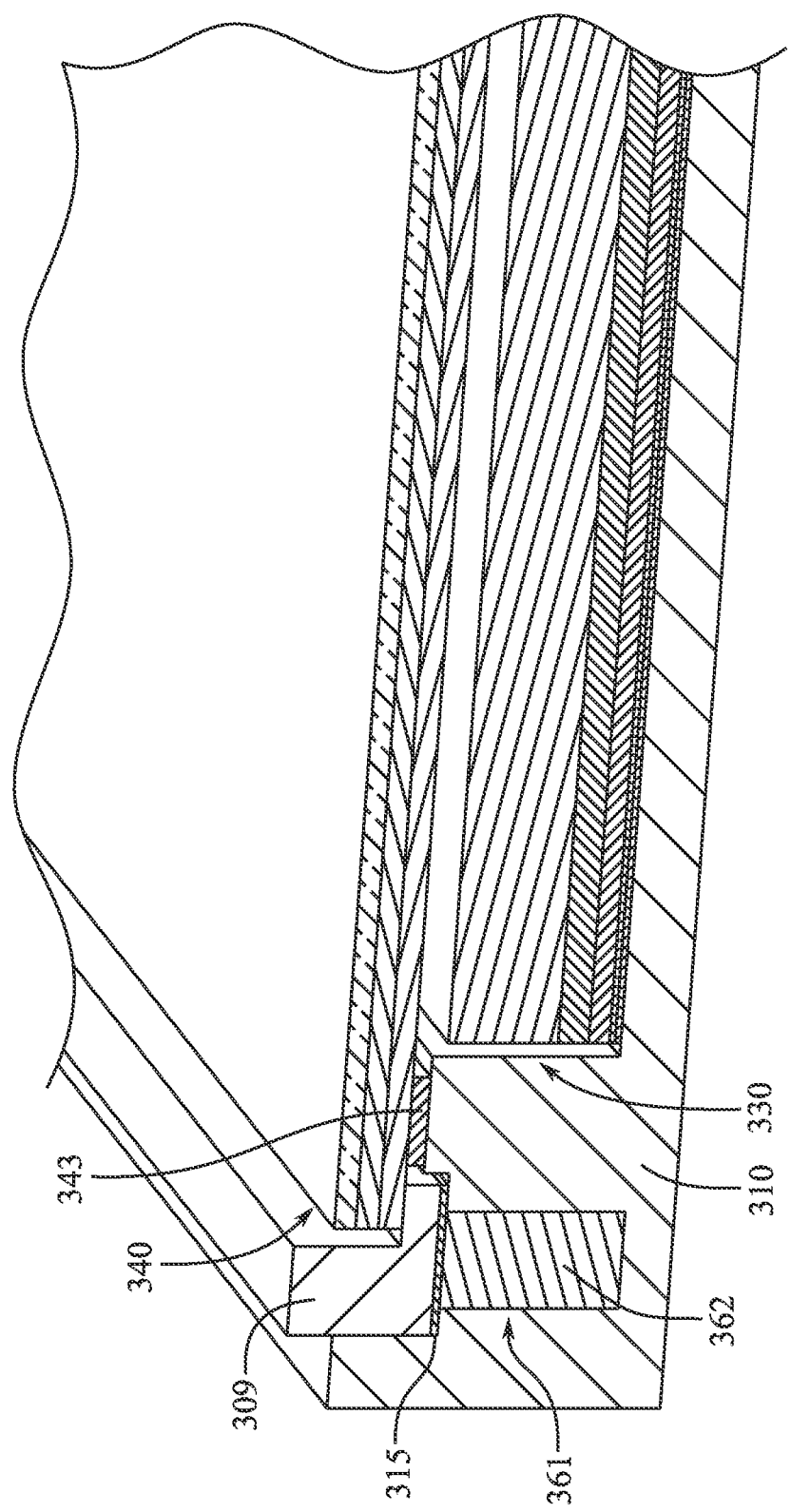
FIG. 3C shows a perspective cross-sectional view of the display portion of the electronic device of FIG. 3A.

FIG. 3C shows a perspective cross-sectional view of the region of the display portion 302 shown in FIG. 3B. As with display portion 202, the display portion 302 can include a display housing 310, a backlight component 330 disposed in an internal volume defined by the display housing 310, a trim 309 that at least partially defines an external surface of the display portion 302 and a mounting surface, and a display cell 340 in contact with the mounting surface of trim 309 and secured to the display housing or enclosure 310. The cavity 361 defined by the display housing 310 can be located below at least a portion of the trim 309 and/or the channel defined by the display housing 310 in which the trim 309 is disposed. In some examples, the cavity 361 can be positioned or located directly under the trim 309 such that the trim 309 can completely obscure or occlude an aperture or orifice leading into the cavity 361.

In some examples, a magnet or magnetic component 362 can be disposed in the cavity 361. In some examples, additional magnets or magnetic components can be disposed in any other cavities defined by the display housing 310, such as those shown in FIG. 3B. In some examples, magnet 362 can be a permanent magnet, such as a bonded or sintered magnet. In some examples, the magnet 362 can be an electromagnet. In some examples, a top surface of the magnet 362 can be substantially flush, co-planar, or in-line with a bottom surface of the channel defined by the display housing 310. In some examples, the magnet 362 can have a shape corresponding to the shape of the cavity 361 such that the magnet fills substantially the entire cavity 361. In some examples, however, the magnet 362 can have substantially any desired shape and additional material or components can fill the remainder of the cavity 361. The magnet 362 can be secured in the cavity 361 by any desired technique, such as by an adhesive, by a retention member, or by the trim 309. Additionally, in some examples, an adhesive 315 can be disposed over the cavity 361 and magnet 362 to secure the trim 309 to the display housing 310. The magnets, such as magnet 362, can interact with a corresponding magnet, magnetic material, or component located in a base portion of the electronic device. In some examples, the magnet 362 can provide a securing force for the display portion 302 against the base portion when the electronic device is in a closed configuration. Additionally, or alternatively, the magnetic field generated by magnets, such as magnet 362, can be detected by one or more sensors in a base portion to provide information regarding the location of the display portion 302 relative to the base portion. In some examples, one or more magnets, such as magnet 362, can include a Halbach array.

Figure 3D:
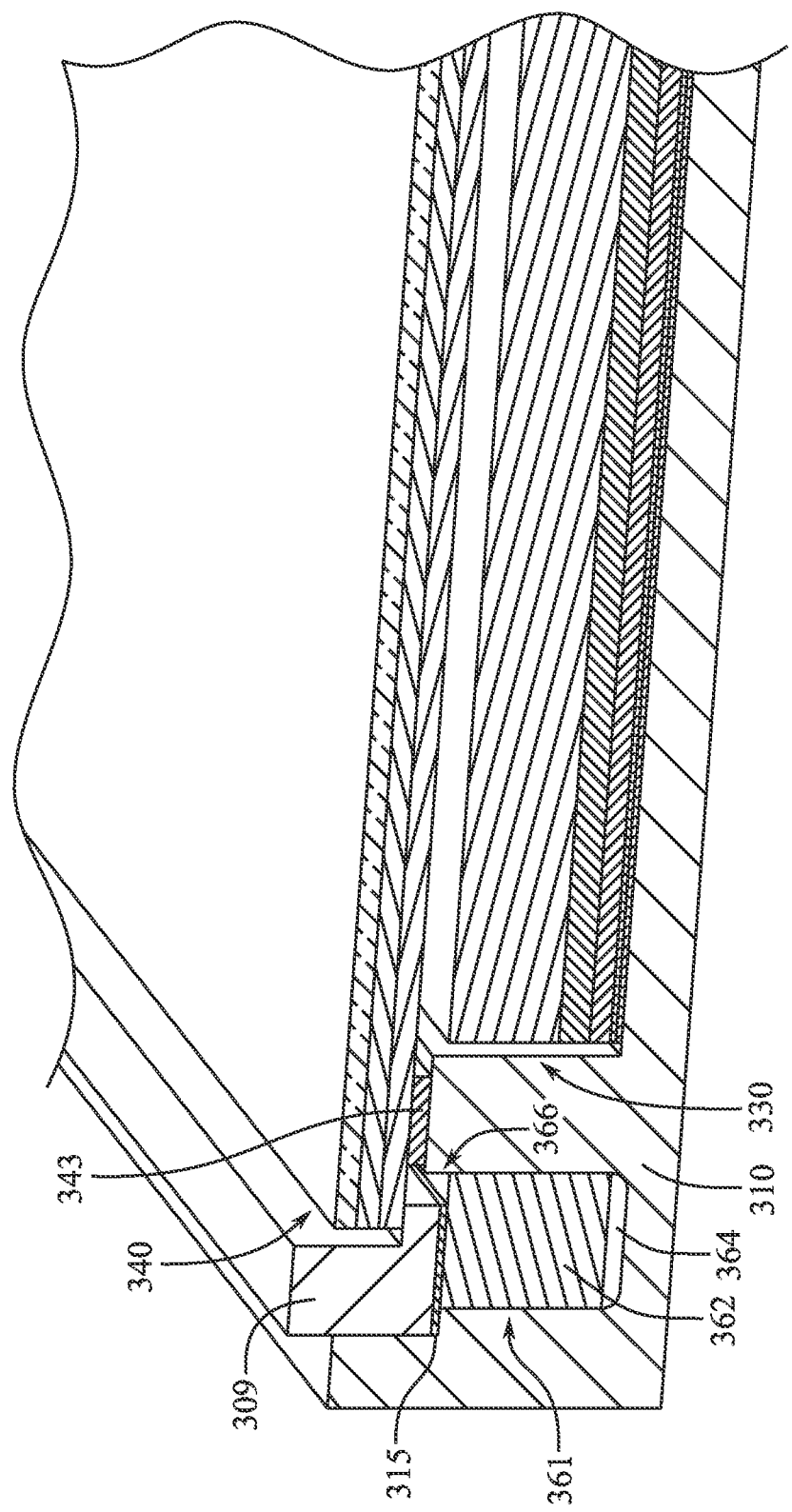
FIG. 3D shows a perspective cross-sectional view of the display portion of the electronic device of FIG. 3A.

FIG. 3D shows a perspective cross-sectional view of an alternative configuration of the region of the display portion 302 shown in FIG. 3B. As with display portion 202, the display portion 302 can include a display housing 310, a backlight component 330 disposed in an internal volume defined by the display housing 310, a trim 309 that at least partially defines an external surface of the display portion 302 and a mounting surface, and a display cell 340 in contact with the mounting surface of trim 309 and secured to the display housing or enclosure 310. The cavity 361 defined by the display housing 310 can be located below at least a portion of the trim 309 and/or the channel defined by the display housing 310 in which the trim 309 is disposed. In some examples, the cavity 361 can be positioned or located directly under the trim 309 such that the trim 309 can completely obscure or occlude an aperture or orifice leading into the cavity 361.

Figure 3E:
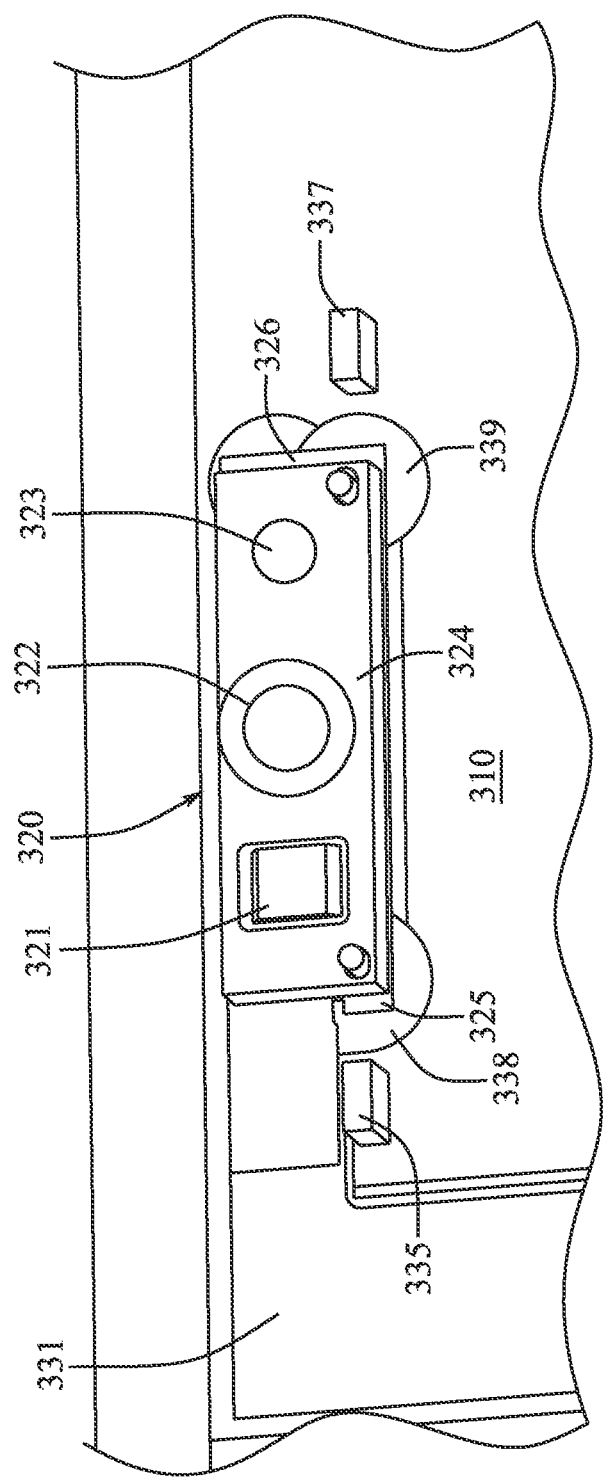
FIG. 3E shows a perspective view of a module of the electronic device of FIG. 3A.

As with the magnetic component 362 described with respect to FIG. 3C, the magnetic component 362 shown in FIG. 3D can be disposed in the cavity 361 and beneath the trim 309. In some examples, the magnetic component 362 can be secured to one or more surfaces of the housing 310 that define the cavity by an adhesive 364. In some examples, the magnet 362 can be as wide as, or wider than, a width of the trim 309. In some examples, the magnet 362 can be positioned such that a region of the magnet 362 can extend past one or more edges of the trim 309. Further, in some examples, the magnet 362 can include a protrusion or protruding portion 366 that can be positioned near or adjacent to the trim 309. This protrusion 366 can serve to increase the volume of magnetic material, thereby increasing the total force exerted by the magnet 362, and can also serve to assist in aligning or positioning the trim 309 thereover. Further details of the construction, architecture, and components of the display portion 302 are provided below with reference to FIG. 3E FIG. 3E shows a perspective view of a region of the display portion 302 illustrated in FIG. 3A, although the display cell is not shown. The region shown in FIG. 3E can be referred to as a camera region or a notch region. In some examples, a camera module 320 can be positioned at the notch region of the display portion. In this particular example, the display cell 340 and backlight component 330 have been omitted for simplicity.

In some examples, the camera module 320 can include a camera component 322, a camera indicator light 323 that can provide a visual indication of when the camera component 322 is in use, and one or more sensors, such as an ambient light sensor 321. The ambient light sensor 321 can provide information to the camera component 322 or a processor controlling the camera component 322, such as through an electrical connector 331 that is electrically coupled to one or more other components of the device 300. For example, this information can allow a processor to adjust the exposure levels of the camera component 322 to obtain a desired image quality. The ambient light sensor 321 can also provide information that can be used, for example, by a processor, to automatically adjust the brightness of the backlight component 330, based on ambient lighting conditions, to achieve a desired level of image quality.

In some examples, one or more posts 335, 337 can be positioned adjacent or nearer to the camera module 320 in the notch region. In some examples, the posts 335, 337 can be integral with, affixed to, or otherwise secured to the display housing 310. As described further with respect to FIG. 3F, the posts can aid in securing or fixing one or more display components, such as the backlight component 330, in one or more directions.

The camera module 320 can include an enclosure 324 that can at least partially define a camera volume that can contain various components of the camera module 320, such as the light sensor 321, the camera component 322, and/or the camera indicator light 323. In some examples, and as described herein, the enclosure 324 can define one or more apertures or openings that are aligned with the components of the camera module, such as the light sensor 321, the camera component 322, and/or the camera indicator light 323. In some examples, the enclosure 324 can include one or more protruding portions 325, 326. In some examples, a protruding portion 325, 326 can define one or more apertures or openings, as shown. Although the present example includes two protruding portions 325, 326 positioned near corners of the enclosure 324, the protruding portions 325, 326 can be positioned at any location or locations extending along some or all of a periphery of the enclosure 324. In some examples, the device 300 can also include one or more alignment components 338, 339. In some examples, one or more alignment components 338, 339 can be secured, fastened, adhered, integrated with, or otherwise attached to the display portion housing 310, as shown. In some examples, the openings defined by the protruding portions 325, 326, can be aligned with posts or other features extending from the alignment components 338, 339, so that these features can pass through the openings and fix the position of the enclosure 324 in one or more directions relative to the display portions housing 310. In some examples, the alignment components 338, 339 can be secured or affixed to the enclosure 324, for example, by an adhesive, by welding, or mechanically, such as with a threaded engagement or a press-fit engagement.

Figure 3F:
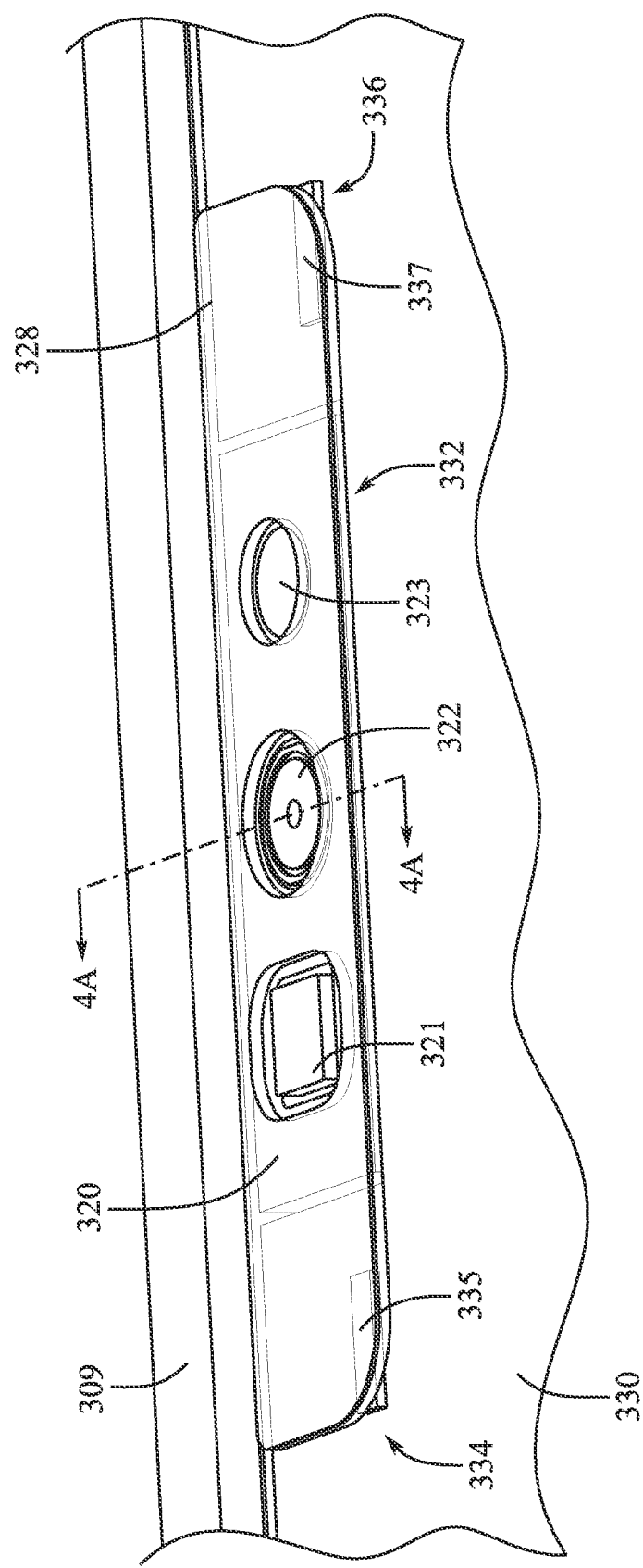
FIG. 3F shows a perspective view of a region of the display portion of the electronic device of FIG. 3A.
Figure 4B:
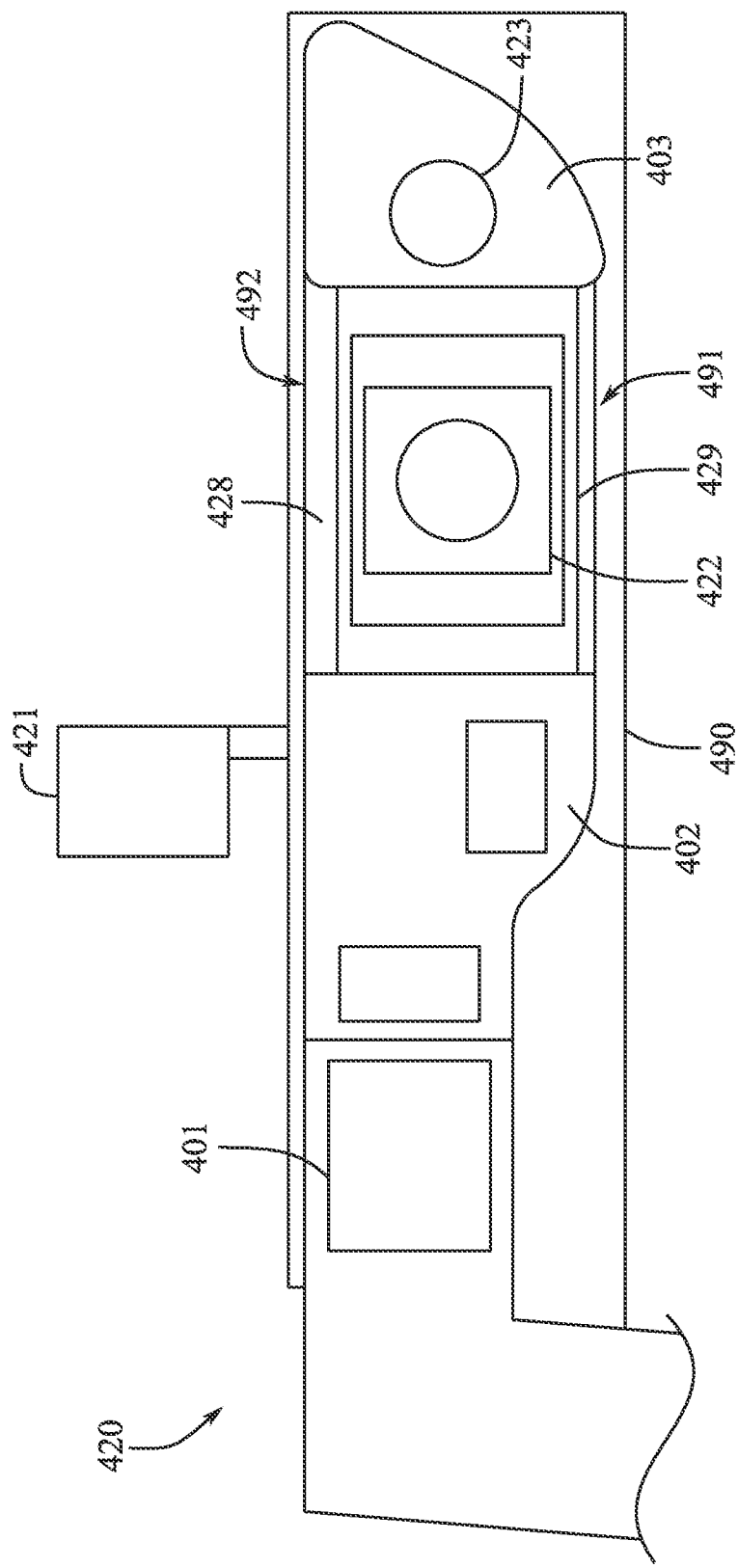
FIG. 4B shows a top view of the module of FIG. 4A.

Referring now to FIG. 3F, which includes the backlight component 330, in some examples, a bracket 328 can be positioned over the camera module. In some examples, the bracket 328 can include a sheet of material, such as a sheet of metal, plastic, ceramic, or combinations thereof. In some examples, the bracket 328 can include a sheet of steel or aluminum. The bracket 328 can serve to protect the camera module 320 and further to aid in securing the camera module 320 in a desired location. In some examples, the bracket 328 can define one or more apertures or orifices that can be aligned with the components of the camera module 320, such as components 321, 322, 323, to provide visual access to the components 321, 322, 323, as desired. The top surface of the bracket 328 can be positioned below a mounting surface of a trim 309. In some examples, however, the top surface of the bracket 328 can be positioned above the mounting surface of the trim 309, and the display cell 340 can include a recessed region or cavity, for example, a cavity defined by a bottom layer thereof, sized and positioned to correspond to the bracket 328.

As described herein, the backlight component 330 can define a notch, cutout, indentation, or recess 332 that can be positioned along an edge of the backlight component 330. In some examples, the notch or recess 332 can have substantially any desired shape, and can be rectangular, circular, triangular, or combinations thereof. For example, as shown, the notch can have a substantially trapezoidal shape. A camera module 320 can be positioned at the notch 332 in the internal volume defined by the display housing 310. The camera module 320 can have a shape corresponding to a shape of the notch 332. In some examples, the top surface of the camera module 320 can be substantially level, co-planar, or flush with the top surface of the backlight component 330. Although the notch or cutout 322 is depicted as being positioned along an edge of the backlight component 330 and/or display cell 340 in this particular example, it should be understood that in some examples, the cutout, notch, or recess 322 can be positioned at any desired location with respect to the backlight component 330 and/or the display cell 340. For example, the cutout 332 can be at least partially, or even entirely, surrounded by active areas of the backlight component 330 and/or display cell 340. That is, the backlight component 330 and/or display cell 340 can define an opening, aperture, and/or inactive area that is surrounded by an active area of the backlight component 330 and/or display cell 340, and the camera module 320 can be positioned at this opening, aperture, and/or inactive area. In some examples, the camera module 320 can include a number of components that utilize visual access to the ambient environment and/or visibility by a user to achieve desired levels of functionality. Accordingly, the location of the camera module 320 at the notch 332 can allow for the maximization of the active area of the backlight component 330 and any overlying display cell, while still providing visual access for the camera module 320.

In some examples, the backlight component 330 can define an active area or a light-emitting area. An active area or a light emitting area is an area of the backlight component 330 that actively produces or emits light which can be visible through an overlying display cell. In some examples, the backlight component 330 can define one or more apertures 334, 336 that can be at least partially surrounded by the active area of the backlight component 330. The apertures 334, 336 can have substantially any desired shape, such as a circular shape, rectangular shape, triangular shape, or combinations thereof. In some examples, the apertures 334, 336 can have a non-circular shape. For example, the apertures 334, 336 can have a substantially oblong or extended shape as shown, including a rectangular central portion with semicircular end portions. In some examples, a first post 335 can be disposed in the first aperture 334, and a second post 337 can be disposed in the second aperture 336. In some examples, posts 335, 337 can have a shape corresponding to the shape of the apertures 334, 336. The one or more posts 335, 337 can be integral with, affixed to, or otherwise secured to the display housing 310. As the posts 335, 337 extend through the apertures 334, 336, the posts 335, 337 can secure or fix the backlight component 330 in one or more directions. For example, the posts 335, 337 can fix or position the backlight component 330 in one or more directions perpendicular or normal to the direction that the posts extend from the back wall of the display housing 310. Additionally, the posts 335, 337 can prevent rotational movement of the backlight component 330 about an axis parallel to the direction that the posts 335, 337 extend from the back wall of the display housing 310.

In some examples, the first aperture 334 and the first post 335 can be positioned adjacent to a first side of the notch 332, and the second aperture 336 and the second post 337 can be positioned adjacent to a second side of the notch 332 opposite the first side. In some examples, the apertures 334, 336 can be positioned a substantially same or similar distance from the notch 332 or an edge thereof. For example, the apertures 334, 336 can be positioned between about 1 mm and about 20 mm from an edge of the notch, such as about 5 mm. A post, such as post 335, can have any desired dimensions. In some examples, a post 335 can have a width of between about 0.5 mm and about 5 mm, or between about 0.5 mm and about 2 mm, for example about 1 mm. In some examples, a post 335 can have a length of between about 0.5 mm and about 10 mm, or between about 1 mm and about 5 mm, for example about 3 mm. Although the present example illustrates two posts 335, 337 disposed in two corresponding apertures 334, 336, in some examples, the backlight component 330 can define any number of apertures at any number of locations, and the display housing 310 can include any number of corresponding posts disposed thereon.

Further, a bracket 328 can be positioned over the camera module and can extend over at least some of the active area of the backlight component 330. In some examples, the bracket 328 can include a sheet of material, such as a sheet of metal, plastic, ceramic, or combinations thereof. In some examples, the bracket 328 can include a sheet of steel or aluminum. In some examples, the bracket 328 can at least partially extend over the apertures 334, 336 and posts 335, 337. The bracket 328 can serve to protect the camera module 320 and further to aid in securing the camera module 320 in a desired location. In some examples, the bracket 328 can define one or more apertures or orifices that can be aligned with the components of the camera module 320, such as components 321, 322, 323, to provide visual access to the components 321, 322, 323, as desired. The top surface of the bracket 328 can be positioned below a mounting surface of a trim 309. In some examples, however, the top surface of the bracket 328 can be positioned above the mounting surface of the trim 309 and the display cell 340 can include a recessed region or cavity, for example, a cavity defined by a bottom layer thereof, sized and positioned to correspond to the bracket 328. Further details of the construction and architecture of a camera module are provided below with reference to FIG. 4A.

FIG. 4A shows a cross-sectional view of a camera module 420 disposed in a display portion of an electronic device, for example, a display portion substantially similar to and including some or all of the features of the display portion 302. The camera module 420 can also be substantially similar to and can include some or all of the features of the camera modules described herein, such as camera module 320.

In some examples, the camera module 420 can include a stiffener or base 490. The base 490 can include any desired material or materials. In some examples, the base 490 can include plastic, metal, ceramic, or combinations thereof. In some examples, the base 490 can include a metallic material, such as steel or aluminum. The base 490 can be secured to a back wall of a display housing 410 at a desired location, for example, as shown in FIGS. 3A and 3D, with adhesives 481, 482. One or more electrical connectors, for example, flexible electrical connectors 428, 429 can be disposed on and secured to the base 490. In some examples, at least one of the flexible electronic connectors 428, 429 can be adjacent to an edge of the base 490. In some examples, one flexible electronic connector 428 can be adjacent to an edge of the base 490 and a second flexible electronic connector 429 may not be directly adjacent to an edge of the base 490.

In some examples, the camera module 420 can further include an enclosure 470 which can also be referred to as a camera enclosure 470. The camera enclosure 470 can be positioned over the base 490 and, along with the base, can at least partially define a camera volume 471. In some examples, the camera enclosure 470 can include a first sidewall 472 that can be secured to the flexible electronic connector 428. The sidewall 472 can be secured or fixed to the flexible electronic connector 428 by any desired technique, such as with an adhesive. In some examples, the sidewall 472 may not directly contact the base 490 and can be secured to the base 490 through its securement or fixture to the flexible electronic connector. In some examples, the camera enclosure 470 can further include a second sidewall 473 that can be positioned opposite the first sidewall 472. In some examples, the second sidewall 473 can be secured to the base 490 by any desired technique, such as with an adhesive. In some examples, the sidewall 473 can be secured to the base 490 at a location adjacent to the flexible electronic connector 429. In some examples, the sidewall 473 can be secured to the base 490 at a location such that at least some of the flexible electronic connector 429 is disposed in the camera volume 471 defined by the enclosure 470.

The camera module 420 can be disposed in the internal volume defined by the display housing 410, for example, adjacent to the back light component 430 at a notch defined by the backlight component 430. Accordingly, the camera component 422 of the camera module, can be disposed near a relatively bright light-emitting component in the backlight component 430. The positioning of light sensitive components such as the camera component 422 near a component that emits relatively bright light can present challenges with respect to light from the backlight component 430 undesirably entering the camera module 420 and/or the camera component 422. The undesirable exposure of the components of the camera module to light from the backlight component 430 can lead to undesired reductions in image quality or noise in images captures by the camera component 422. In order to reduce the amount of light from the backlight component 430 that can undesirably affect the camera component 422, the camera enclosure 470 and the sidewalls 472, 473 can include a substantially opaque or light blocking material. In some examples, the camera enclosure 470 can include a relatively reflective material. For example, an exterior surface of the camera enclosure 470 defined by one or more of the sidewalls 472, 473 can have a relatively high reflectivity so that light from the backlight component 430, illustrated in FIG. 4A with dashed arrows, can be reflected off of the enclosure 470 and directed away from the camera component 422.

Further, in some examples, the exterior surface of the camera module 420 defined by the enclosure 470 can have a reflectivity that can be substantially similar to or the same as a reflectivity of the material of those portions of display housing 410 that define the internal volume in which the backlight component 430 and the camera module 420 are disposed. Accordingly, in some examples, the enclosure 470, such as the exterior surface of sidewall 473, can have a reflectivity that is substantially similar to or the same as the reflectivity of a machined metal, such as machined titanium, aluminum, and/or steel. In this way, light produced by the backlight component 430 will be reflected by the camera enclosure 470 with the same intensity as light reflected by the display housing 410, thus providing for substantially even lighting from the backlight component 430 along the entire periphery thereof.

In some examples, the enclosure 470 can include a light reflecting material. In some examples, the enclosure 470 can include a matrix material including a light reflecting material disposed or dispersed therein. For example, the enclosure 470 can include a polymer or plastic material with light reflecting particles or dye dispersed therein, such as titanium dioxide or other ceramic particles. In some examples, some or all of the exterior surface defined by the enclosure 470 can include a surface coating to provide a desired reflectivity. In some examples, the surface coating can include a paint, metal layer, ceramic layer, physical vapor deposition layer, ink, dye, or any combination thereof. In some examples, the enclosure 470 can be produced by a double-shot molding process where a reflective material can be molded around a first material that defines the camera volume. Further, any adhesive material used in the camera module 420 can be opaque so as to prevent or reduce any total-internal-reflection (TIR) pathways from the exterior of the module 420 to the internal volume through the adhesive. For example, an adhesive used to secure the sidewall 473 to the base 490 can be substantially opaque. In some examples, the adhesive can include a dye, ink, or other material configured to provide a desired level of opacity.

In some examples, the camera enclosure 470 can defined an opening disposed over the camera component 422 located in the volume 471. In some examples, the sidewalls 472, 473 can at least partially define the opening. In some examples, some or all of the enclosure 470, for example the sidewalls 472, 473, can be secured, joined, sealed, or otherwise attached or affixed to the display cell 440 at locations overlying the camera enclosure 470. In some examples, an opaque gasket or other material such as foam 485 can be disposed between the enclosure 470 and the display cell 440 to prevent or reduce light from the backlight component 430 entering the volume 471. In some examples, multiple layers of adhesive or other material 483, 484, 486 can be used to secure the foam 485 to the enclosure 470 and the display cell 440 to substantially isolate the volume 471 of the camera module 420 from substantially any light produced by the backlight component 430. Further details of the camera module 420 are illustrated with respect to FIG. 4B.

In some examples, the camera enclosure 470 (not shown) can extend around substantially the entire periphery of the base 490. Accordingly, in some examples, additional components can be disposed in the volume 471 defined by the enclosure 470 and the base 490. For example, one or more printed circuit boards 402, 403 can be disposed on the base and can be at least partially disposed in the volume 471. In some examples, a printed circuit board 403 can have a camera indicator light 423 or other component attached thereto that is disposed in the volume 471. In some examples, the enclosure 470, such as the sidewalls thereof, can be positioned over or secured to the base adjacent to the periphery of the printed circuit board 403. The camera module 420 can further include a sensor, such as an ambient light sensor 421, that can be electrically connected to a printed circuit board 402 disposed on the base. The sensor 421 can be connected to the printed circuit board 402 by a flexible connector, and in some examples, can be folded over onto the printed circuit board 402 so that the sensor 421 is also disposed in the camera volume 471.

As described with respect to FIG. 4A, the camera module 420 can include a first flexible electronic connector 428 secured to the base 490. The first flexible electronic connector 428 can be in communication with one or more components, such as a processor that is also disposed on the base. The camera module 420 can include a second flexible electronic connector 429 secured to the base 490. The second flexible electronic connector 429 can be in communication with one or more components, such as a processor that is also disposed on the base. In some examples, the flexible electronic connectors 428, 429 can provide electronic signals between components that can be positioned on opposite sides of the base 490, for example, components that are disposed on opposite sides of the camera component 422. In some examples, the sidewall 472 (not shown) of the enclosure 470 can be secured to the first flexible electronic connector 428 at a first location 492 which can overlie the flexible electronic connector 428. Meanwhile, the second sidewall 472 can be secured to the base 490 at a second location 491 that is adjacent to the second flexible electronic connector 429. In some examples, the camera module 420 can further include one or more additional connection components, such as an electronic or board-to-board connector 401, that can electrically connect the camera module 420 to one or more other components of the display portion and/or a device including the display portion.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding engagement and retention features, can apply not only to the specific examples discussed herein, but to any number of embodiments in any combination. Various embodiments of electronic devices including components having various features in various arrangements are described below, with reference to FIGS. 5A-6D.

Figure 5A:
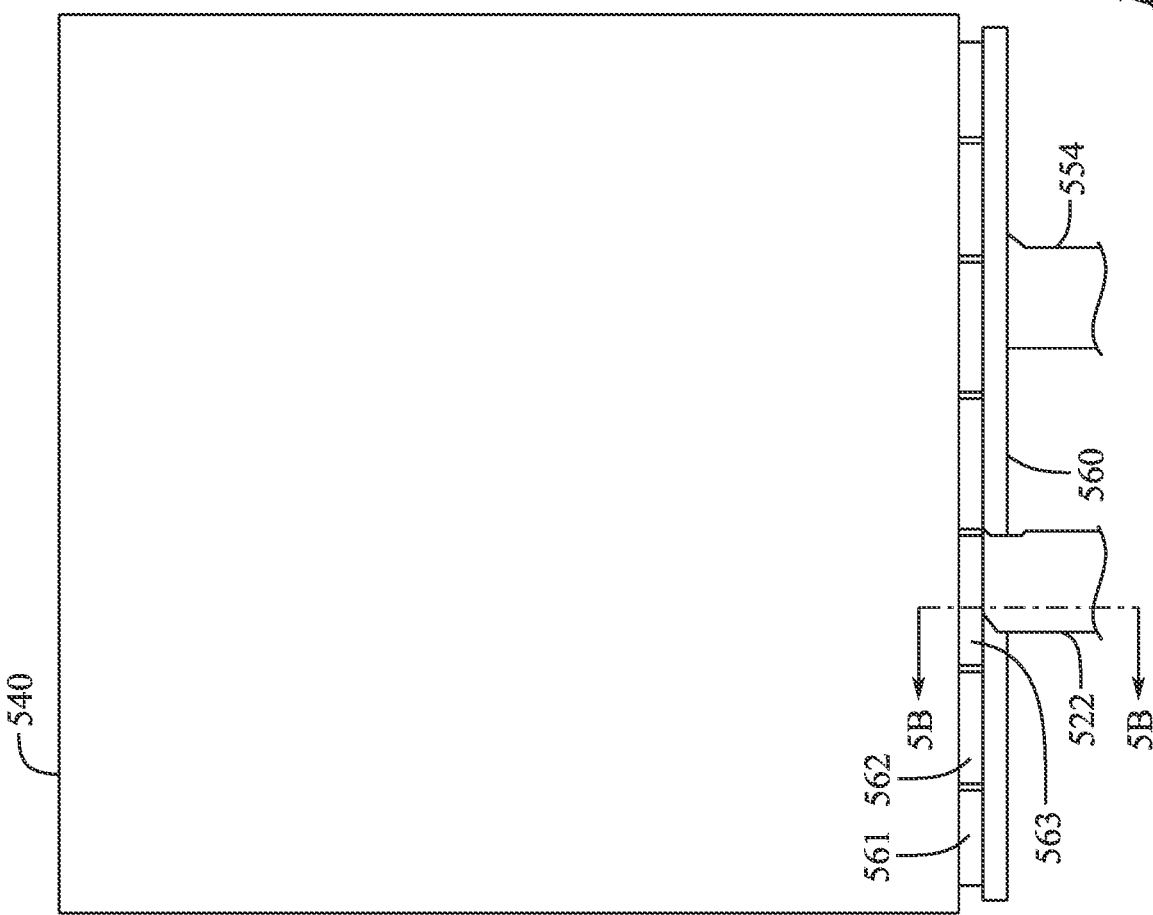
FIG. 5A shows a front view of a display component of an electronic device.

FIG. 5A shows a front view of a display cell 540 of an electronic device. The display cell 540 can be substantially similar to and can include some or all of the features of the display cells described herein, such as display cell 240. The display cell 540 can also be included in a display portion of an electronic device, as described herein, such as display portion 202. As can be seen, the display cell 540 can have a substantially rectangular shape, although in some examples the display cell 540 can have substantially any shape as desired. In some examples the display cell 540 can include a thin film transistor (TFT) LCD display. In some examples, one or more electronic connectors 561, 562, 563 can be electrically connected to one or more components of the display cell 540, such as a TFT LCD cell (not shown), to provide electronic communication and signals to and from the components of the display cell 540. In some examples, the electronic connectors 561, 562, 563 can be disposed alone an edge of the display cell 540, for example, a bottom or lower edge thereof. Thus, in some examples where the display cell 540 can be included in a display portion such as display portion 202, the electronic connectors 561, 562, 563 and any components connected thereto, such as electronic component 560, can be disposed in the portion of internal volume of the display portion 302 that is at least partially defined by the front wall 311.

In some examples, the electronic connectors 561, 562, 563 can be connected to and can be in communication with an electronic component 560. In some examples, the electronic component 560 can include a printed circuit board having one or more electronic components thereon. In some examples, the electronic component 560 can include a controller for the display cell 540, such as a timing controller. In some examples, the electronic component 560 can thus include a timing controller (T-Con) board. In some examples, one or more flexible electronic connectors 552, 554 can be electrically connected or coupled to the T-Con board and to one or more additional electronic components of the device, including the display cell 540 as described herein, for example one or more electronic components disposed in a base portion of an electronic device.

The components shown in FIG. 5A can be arranged in one or more different positions when disposed in a display housing such as display housing 310 because the flexibility of the electronic connectors 561, 562, 563 can allow for the T-Con board 560 to be rotated or moved relative to the display cell 540. FIG. 5B shows a cross-sectional view of the display cell 540 including the T-Con board in a configuration as could be used when the display cell 540 is disposed in a display housing, such as display housing 310, with the T-Con board positioned behind the front wall 311.

In some examples, and as shown in FIG. 5B, the T-Con board can be folded back so that it underlies or overlies at least a portion of the display cell 540. The flexibility of the electronic connectors 561, 562, 563 can allow the T-Con board to assume this position while maintaining an electrical connection with the display cell 540. In some examples, the T-Con board 560 can be disposed near, or substantially adjacent to, a surface of the display cell 540. The T-Con board 560 can further include one or more connectors thereon, such as a board-to-board connector 565 that can electronically connect the T-Con board 560, and thus the display cell 540, to one or more electronic components, for example, components disposed in a base portion of an electronic device. In some examples, the flexible electronic connector 552 can be joined to the connector 565 to provide such a connection. This architecture, where the T-Con board can be sized and shaped to be disposed in a portion of a display volume defined by a front wall positioned along a lower edge of the display cell can allow for signal processing and timing programs to be carried out by components disposed in the display portion of an electronic device, and can thus reduce or minimize the size, width, and amount of the connectors that are required to pass from the display portion to a base portion to achieve desired levels of performance. Further details of the construction, architecture, and components of the electrical connectors of an electronic device are described below with reference to FIGS. 6A-6D.

Figure 6C:
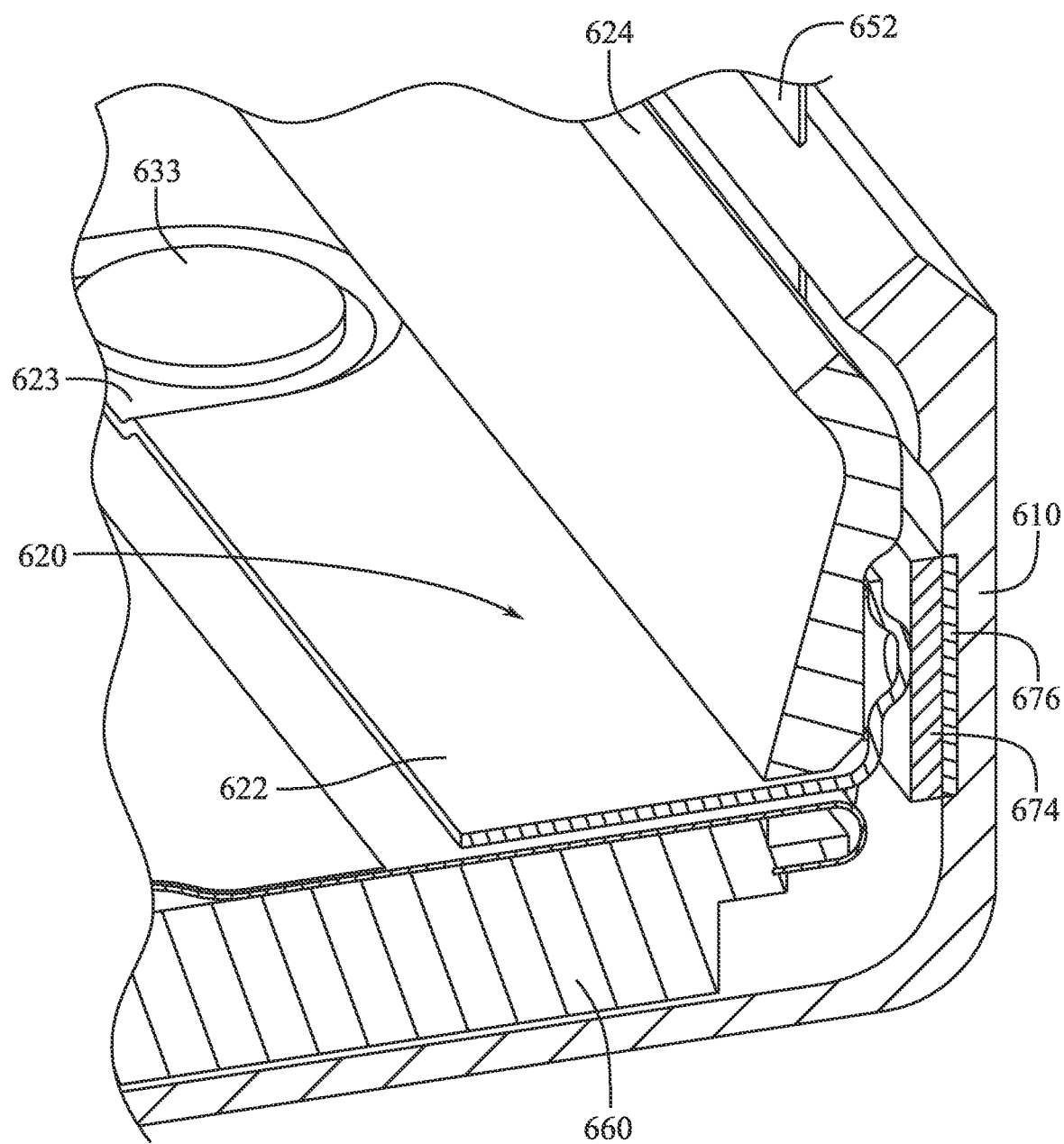
FIG. 6C shows a perspective cross-sectional view of the region of the display portion of FIG. 6A.

FIG. 6A shows a perspective view of an exploded region of a display portion of an electronic device, for example, the region of the display portion 302 indicated with a dashed circle in FIG. 3A. As can be seen, the display portion can include a display cell 640 that can be secured to a display housing 610. The display housing 610 can be substantially similar to and can include some or all of the features of the display housings described herein, such as display housing 310. Additionally, the display cell 640 can be substantially similar to and can include some or all of the features of the display cells described herein, such as display cell 540. As with display cell 540, the display cell 640 can include two flexible electronic connectors 652, 654 that are electronically coupled to the display cell 640, for example, through a T-Con board or one or more other components. The display portion can further include a grounding component 620 that can assist in electrically grounding the flexible electronic connectors 652, 654, for example, to the display housing 610. The grounding component 620 can be an elongated component that can be disposed over the flexible electronic connectors 652, 654 and can exert a pressure on the flexible electronic connectors 652, 654 to push the flexible electronic connectors 652, 654 against another component to electrically ground the flexible electronic connectors. Further details of the display portion are described with respect to FIGS. 6B-6D.

FIG. 6B illustrates a front view of an edge region of a display portion of an electronic device, for example, a region adjacent to the region shown in FIG. 6A. As shown, the edge region can be a corner region of the display portion of an electronic device and the display portion can include a hinge 670 that can be coupled to a corresponding base portion of the device, as described herein. Although only one hinge component 670 is shown, the device can include multiple hinge components 670 positioned along one or more edge of the display portion.

The display portion can include a display housing 610, as described herein, as well as a circuit board or T-Con board (not shown) that can be electrically coupled to a display cell 640. The display portion can further include a grounding component 620 that can assist in electrically grounding the circuit board (not shown), for example, to the display housing 610. In some examples, the grounding component 620 can be secured to the display housing 610 by one or more retention components that can engage with retention features of the grounding component. For example, the grounding component 620 can define a retention feature, such as an aperture or orifice, and a retaining component 633 can pass through the feature to be received by a corresponding feature in the display housing 610 and can secure the grounding component 620 thereto.

As described herein, the display cell 640 can be secured or fixed in one or more directions with respect to the display housing 610 by a number of components or techniques. In some examples, the display housing 610 can define a recess, indentation, and/or trench 611 that can be disposed below at least a portion of the display cell 640 when the display cell 640 is fixed to the display housing 610, as described herein. In some examples, an adhesive and/or a glue 612 can be disposed in the trench 611 to secure at least a portion of the display cell 640 to the display housing 610. The adhesive 612 can be substantially similar to any of the adhesives or adhesive materials described herein. Further, the depth, width, and overall size of the trench 611 can be selected so that a desired amount of adhesive, for example, an amount that can achieve a desired bond strength between the display cell 640 and the display housing 610 can substantially fill the trench 611, thereby simplifying the process for dispensing or applying the adhesive 612 to the display housing 610.

Although shown as being located along a single edge of the display housing 610 in FIG. 6B, the trench 611 and/or adhesive 612 can be positioned around some or all of a periphery of the display housing 610 and/or display cell 640. In some examples, the configuration described herein with respect to FIG. 6B can serve to prevent or reduce cracking or other damage along an edge of the display cell 640 during a high-force or high-stress events, such as drop events.

FIG. 6C shows a perspective cross-sectional view of the region of the display portion shown in FIG. 6A, including the display housing 610 that at least partially defines a display internal volume. As described herein, the T-Con board 660 can be connected to the display cell (not shown) and can be disposed in the internal volume. A flexible electronic connector 652 can be connected to the T-Con board 660 and can extend therefrom. In some examples, the grounding component 620 can be secured to the display housing 610 by one or more retention components that can engage with retention features of the grounding component. For example, the grounding component 620 can define a retention feature 623, such as an aperture or orifice, and a retaining component 633 can pass through the feature 623 to be received by a corresponding feature in the display housing 610 and secure the grounding component 620 thereto. This is merely one example of a retaining feature, and the grounding component 620 can be retained or secured in a desired position by any technique or combination of techniques as desired.

In some examples, the grounding component 620 can include a bracket 622 that can be a substantially "L" shaped or curved portion of material. In some examples, the bracket 622 can include sheet metal, such as a sheet of aluminum or steel that is formed into a desired "L" shape having a first portion that is at an angle, such as a right angle, to a second portion. In some examples, the retaining feature 623 can be defined by the bracket 622. The grounding component 620 can also include a flexible electronic connector guide 624 that can serve to physically contact and direct the flexible electronic connector 652 as the display portion rotates or moves relative to the base portion, to ensure that the flexible electronic connector 652 does not interfere with or become damaged by such rotation. In some examples, the flexible electronic connector guide 624 can be secured to the bracket 622 by any desired technique. A portion of the grounding component 620, such as the bracket 622, can contact and press against the flexible electronic connector 652 at a desired location so that the flexible electronic connector 652 is in electrical contact with the display housing 610. For example, the display housing can include a conductive gasket 674 that can define a surface against which the flexible electronic connector 652 is pressed by the grounding component 620 to provide electrical contact therebetween. In some examples, the conductive gasket 676 can include a conductive polymer and/or a polymer including conductive material dispersed throughout. In some examples, the conductive gasket 674 can be secured or affixed to the display housing by an adhesive, such as a conductive adhesive 676.

Figure 6D:
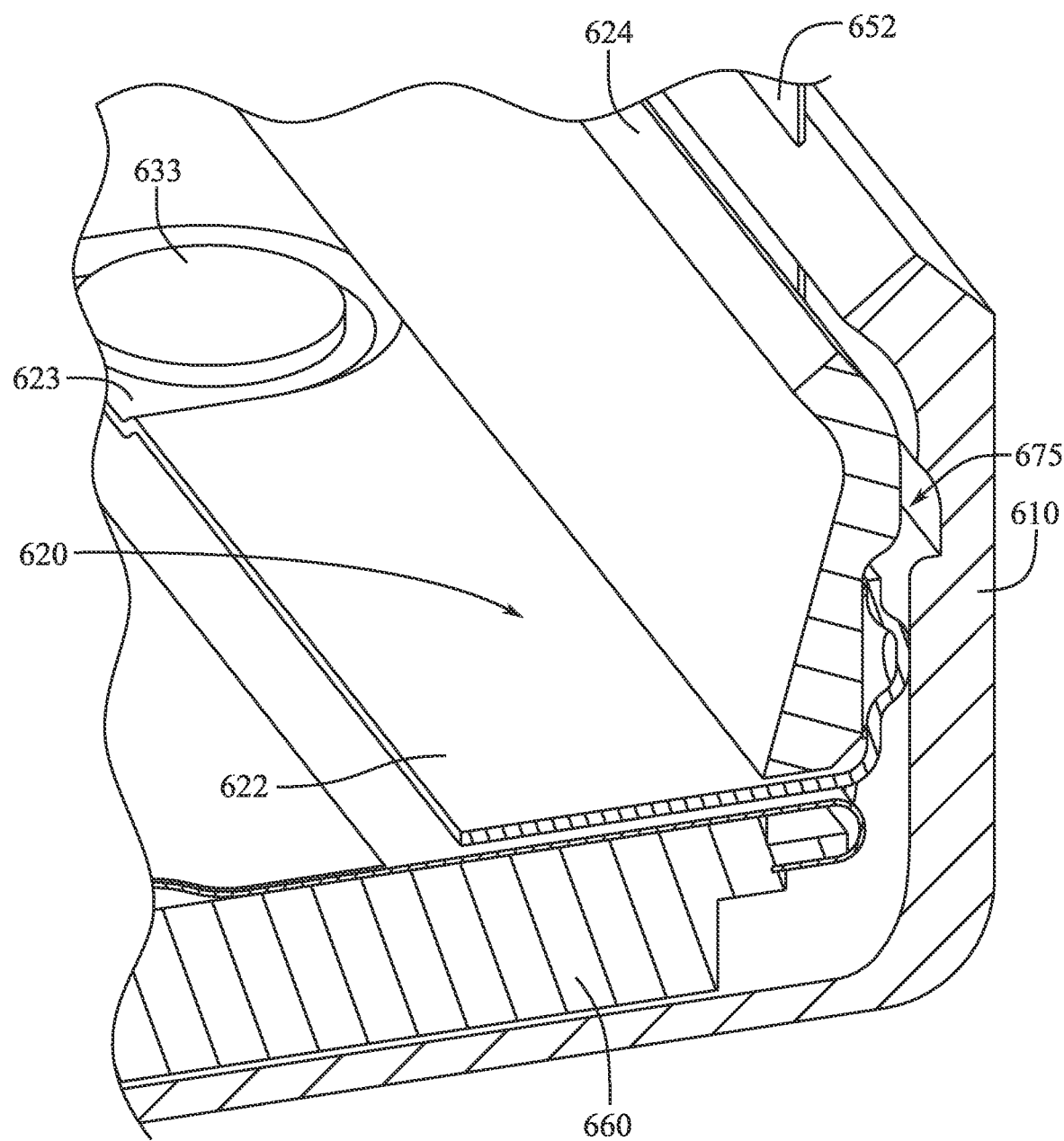
FIG. 6D shows a perspective cross-sectional view of the region of the display portion of FIG. 6A.

FIG. 6D shows a perspective cross-sectional view of an alternative configuration of the region of the display portion shown in FIG. 6A, including the display housing 610 that at least partially defines a display internal volume. Whereas the example illustrated with respect to FIG. 6C can include a conductive gasket 674, in some examples and as shown in FIG. 6D, the housing 610 can include a bump or protrusion 675 that can be positioned opposite or near to the bracket 622. Similar to the manner in which the bracket 622 can electrically contact the gasket 674 of FIG. 6C, the bracket 622 can electrically contact the protrusion 675. That is, the protrusion 675 can define a surface against which the flexible electronic connector 652 is pressed by the grounding component 620 to provide electrical contact therebetween. Further details of examples including flexible electrical connectors and various configurations of the display portion and base portion of an electronic device are described below with respect to FIGS. 7A-7C.

Figure 7A:
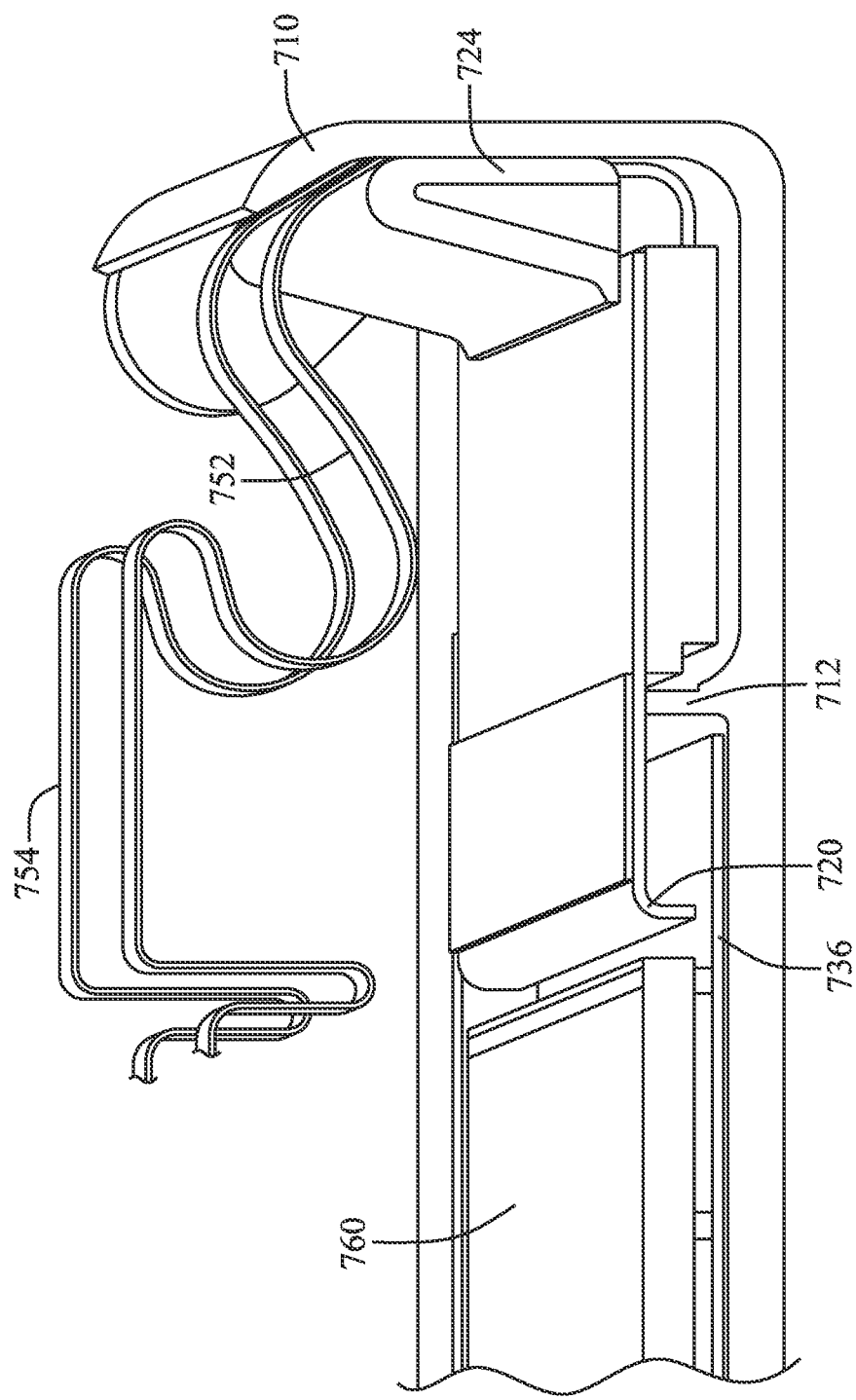
FIG. 7A shows a perspective cross-sectional view of a region of a display portion of an electronic device.

FIG. 7A shows a perspective cross-sectional view of a region of the display portion similar to the region illustrated in FIG. 6C. As with the display portion illustrated in FIG. 6C, the display portion of FIG. 7A can include a display housing 710 that at least partially defines a display internal volume. A display cell and/or backlight component 760 can be affixed, secured to, and/or carried by the display housing 710, as described herein. Although referred to as a display cell 760, in some examples, the display cell 760 can include any combination of display cell and backlight component, as described herein. Further, a grounding component 624 that can include a flexible electronic connector guide that can serve to physically contact and direct the flexible electronic connectors 752, 754 as the display portion rotates or moves relative to a base portion, to ensure that the flexible electronic connectors 752, 754 do not interfere with or become damaged by such rotation. Further details regarding the rotation or movement of the display portion relative to the base portion are described with respect to FIGS. 7B and 7C.

In some examples, a component 720 of the display portion can include a lip or a shelf, as shown, that can be positioned adjacent or near to an edge of the display cell 760. In some examples, the shelf of the component 720 can define a surface that is substantially parallel to an edge of the display cell 760. In some examples, the shelf of the component 720 can be separate from an edge of the display cell 760 by a distance of less than about 10 mm, less than about 5 mm, less than about 3 mm, less than about 2 mm, less than about 1 mm, less than about 0.5 mm, or even less than about 0.1 mm or smaller. In some examples, an edge of the display cell 760 can abut the shelf of the component 720. In some examples, the component 720 can be supported by, affixed to, and/or disposed on a portion 712 of the display housing 710.

In use, the shelf of the component 720 can serve to assist in fixing or retaining the position of the display cell 760 in one or more desired directions with respect to the display housing 710. For example, the component 720 can serve as a physical barrier to prevent movement of some or all of the portions or films of the display cell 760 from sliding or moving relative to the display housing 710 during high-force or high-stress events, such as drop events. Accordingly, in some examples, the component 720 may not contact or fix the position of the display cell 710 except during high-stress events or other scenarios that may cause undesirable movement of the display cell 760 with respect to the display housing 710.

In some examples, the component 720 can be have additional functionality beyond acting as a barrier or stop for the display cell 760. For example, the component 720 can include a mounting component for circuit boards, LEDs, or other components of the display portion 720. Additionally, some or all of the component 720 can be disposed over a portion of the display cell 760, such as a portion of the backlight component 736, as shown.

Figure 7B:
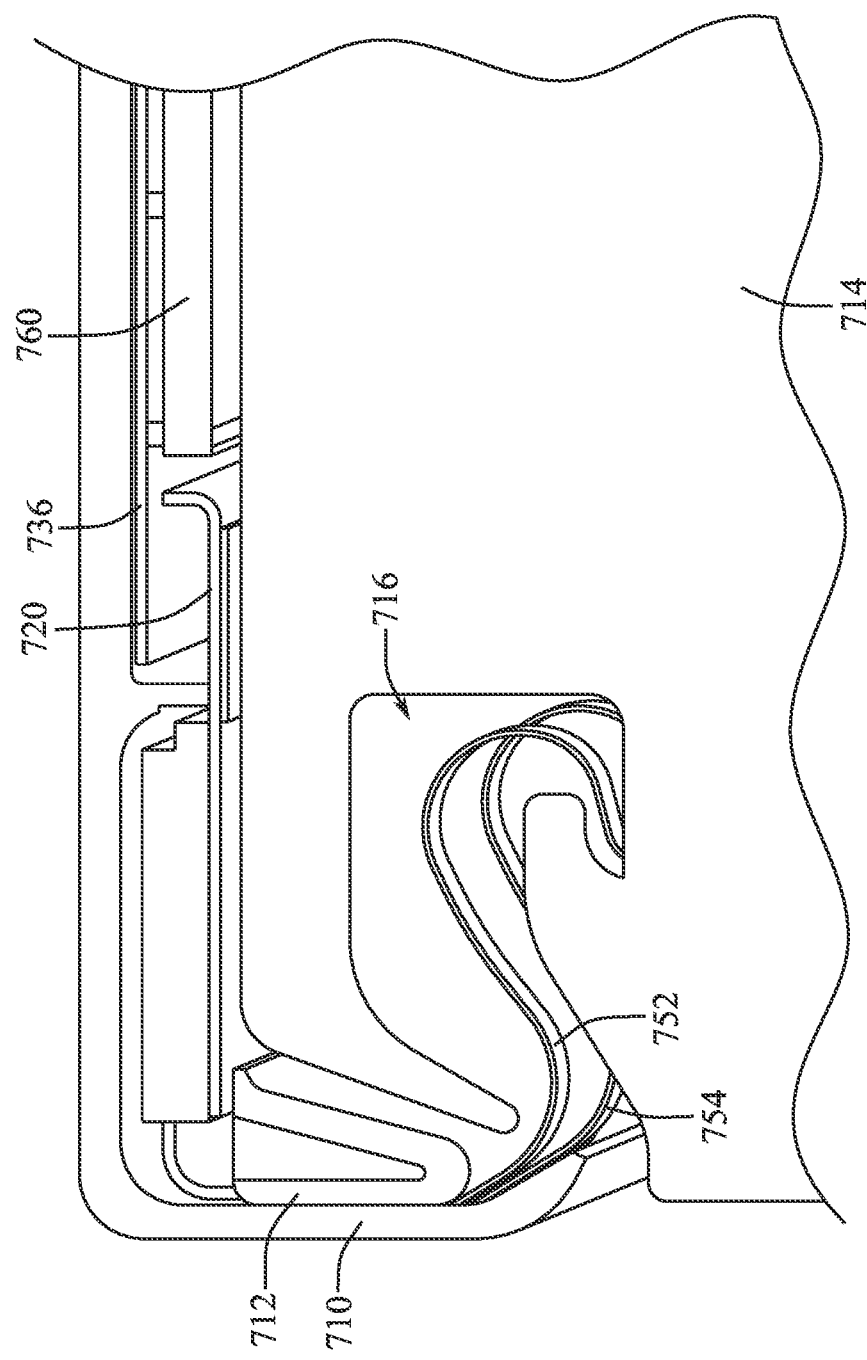
FIG. 7B shows a cross-sectional view of a display portion and a base portion of an electronic device in a closed position.

FIG. 7B shows the display portion of FIG. 7A coupled to a base portion 714 of an electronic device, as described herein. Various details, features, and components of the base portion 714 are not illustrated for simplicity. As can be see, the base portion 714 and/or the components or features thereof can define a volume or cavity 716 into which flexible electronic connectors 752, 754 can extend from the display portion. The flexible electronic connectors 752, 754 can then be electrically connected to one or more components of the base portion 714, as described herein. The electronic device shown in FIG. 7B is in what can be referred to as a closed position or a closed configuration, whereby the base portion can cover or occlude all or substantially all of the active area of the display cell 760. As can be seen, the display housing 710 and the base portion 714 can serve to protect the flexible electronic connectors 752, 754 from an exterior environment when the electronic device is in the closed position.

Figure 7C:
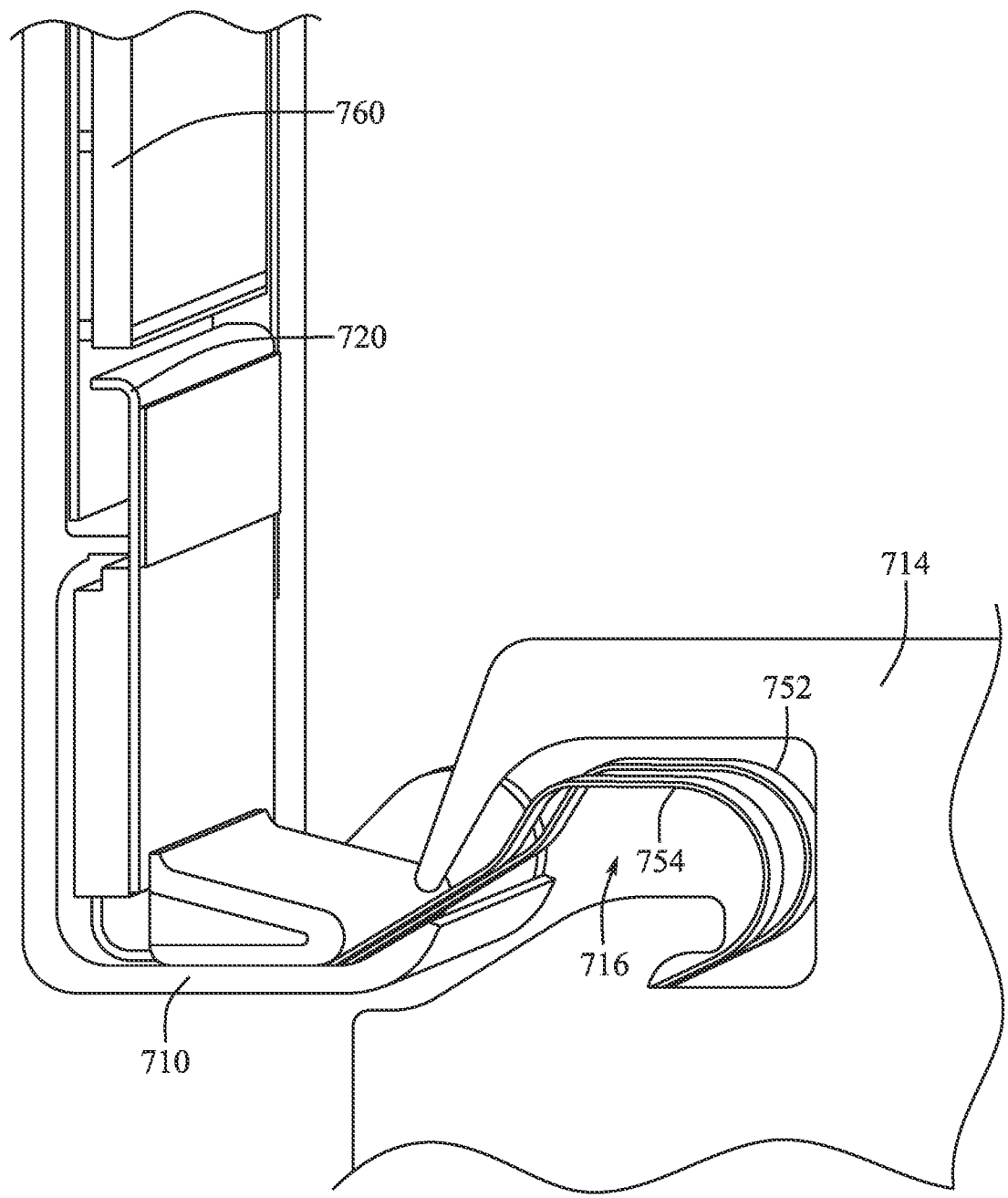
FIG. 7C shows a cross-sectional view of a display portion and a base portion of an electronic device in an open position.

FIG. 7C shows the display portion and base portion of the electronic device of FIG. 7B in an open position or configuration. That is, the display portion has been rotated or moved relative to the base portion 714 so that the active area of the display cell 760 is no longer occluded by the base portion and a user can, for example, view information or content on display by the display cell 760. The shape of the display housing 710 and the cavity 716 of the base portion can continue protecting the flexible electronic connectors 752, 754 from the external environment when the device is in the open position. Further, the display portion and base portion can be shaped and oriented such that the flexible electronic connectors 752, 754 can have one or more desired bend radii. That is, the bend radius of any portion of the flexible electronic connectors 752, 754 can be small enough to house within the base portion, but not so small or tight that undesired crimping or folding of the flexible electronic connectors 752, 754 may occur. In some examples, one or more portions of the flexible electronic connectors 752, 754 can have a bend radius of less than 5 mm, less than 3 mm, less than 2 mm, or even less than 1 mm when in an open position, such as about 2.5 mm. In some examples, one or more portions of the flexible electronic connectors 752, 754 can have a bend radius of less than 5 mm, less than 3 mm, less than 2 mm, or even less than 1 mm when in a closed position, such as about 2 mm.

While the present disclosure generally describes components and features of a display portion of an electronic device, the components and features described herein can be used in any combination or order and with any desired component or electronic device. Further, the components and features can assume any geometric shape, pattern, size, or combination of shapes, patterns, and sizes. Additionally, the features described herein can be positioned on or extend from any surface or surfaces of any desired housing and/or components.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
a housing comprising a sidewall with a channel formed therein;
a trim disposed inside the channel, the trim at least partially defining an orifice and a portion of an exterior surface of the electronic device, and the housing defining a cavity disposed at least partially beneath the trim;
a magnet disposed in the cavity; and
a display cell in contact with the trim at the orifice and secured to the housing,
wherein the trim includes at least one of aluminum, stainless steel, ceramic, or plastic.

2. The electronic device of claim 1, wherein an adhesive layer fills a gap formed between a portion of the sidewall and the display cell.

3. The electronic device of claim 1, wherein the trim fixes a position of the display cell along an axis normal to the orifice.

4. The electronic device of claim 1, wherein:
the trim defines a mounting surface and a visible surface, the mounting surface oriented parallel to and offset from the visible surface;
the display cell contacts the mounting surface; and
the visible surface at least partially defines the exterior surface of the electronic device.

5. The electronic device of claim 4, wherein the mounting surface extends around a perimeter of the orifice and has a width of between about 0.1 mm and about 1 mm.

6. The electronic device of claim 5, wherein the display cell is spaced apart from a protrusion of the trim that defines the visible surface by a width of between about 0.1 mm and about 0.3 mm.

7. The electronic device of claim 1, wherein the display cell is secured to the housing by a reworkable adhesive.

8. The electronic device of claim 7, wherein:
the reworkable adhesive comprises a stretch releasable adhesive; and
the housing at least partially defines an access point where the stretch releasable adhesive is in communication with an ambient environment.

9. The electronic device of claim 1, further comprising a backlight component underlying the display cell, the backlight component disposed in an internal volume defined by the housing.

10. The electronic device of claim 1, wherein:
the housing comprises a display portion housing and the electronic device further comprises a base portion, the display portion housing rotatably mounted to the base portion; and
the housing comprises a back wall opposite the display cell and a front wall adjacent to an edge of the display cell, the front wall defining a portion of the exterior surface parallel to a surface of the display cell.

11. The electronic device of claim 1, wherein the housing defines an internal volume and the electronic device further comprises a component secured to the housing and disposed in the internal volume, the component comprising a shelf positioned adjacent to an edge of the display cell.

12. The electronic device of claim 1, wherein the display cell comprises a transparent cover that at least partially defines the exterior surface of the electronic device.

13. The electronic device of claim 9, wherein:
the backlight component defines an aperture surrounded by an active area of the backlight component; and
the housing comprises a post disposed in the aperture.

14. An electronic device, comprising:
a housing comprising a sidewall that defines a channel;
a trim disposed inside the channel, the trim at least partially defining an orifice and a portion of an exterior surface of the electronic device, the trim including a mounting surface that is raised relative to an adjacent portion of the sidewall; and
a display cell having a visible surface substantially parallel and offset from the mounting surface, the display cell in contact with the mounting surface and secured to the housing.

15. The electronic device of claim 14, wherein the trim is configured to fix a position of the display cell during manufacturing.

* * * * *